(12) United States Patent
Widrevitz et al.

(10) Patent No.: US 9,641,460 B2
(45) Date of Patent: May 2, 2017

(54) POWER EFFICIENCY IMPROVEMENT IN NETWORK EQUIPMENT USING SERVICE GROUP CONSOLIDATION

(71) Applicant: ARRIS Enterprises, Inc., Suwanee, GA (US)

(72) Inventors: Benjamin Widrevitz, Downers Grove, IL (US); William Turner Hanks, Carol Stream, IL (US); Dwain E. Frieh, Oswego, IL (US); Thomas J. Cloonan, Lisle, IL (US); Steven John Krapp, Naperville, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 90 days.

(21) Appl. No.: 14/837,625

(22) Filed: Aug. 27, 2015

(65) Prior Publication Data

US 2017/0026315 A1     Jan. 26, 2017

Related U.S. Application Data

(60) Provisional application No. 62/194,560, filed on Jul. 20, 2015.

(51) Int. Cl.
*G08C 17/00* (2006.01)
*H04L 12/931* (2013.01)
(Continued)

(52) U.S. Cl.
CPC ............. *H04L 49/40* (2013.01); *H04W 52/02* (2013.01); *H04W 52/04* (2013.01)

(58) Field of Classification Search
CPC ...... H04W 52/242; H04W 52/02; H04L 49/40
See application file for complete search history.

(56) References Cited

U.S. PATENT DOCUMENTS 6,839,829 B1   1/2005 Daruwalla et al.
7,958,229 B2   6/2011 Conway
(Continued)

FOREIGN PATENT DOCUMENTS

WO   02/13465 A1      2/2002
WO   2012087184 A1    6/2012
WO   2014000804 A1    1/2014

OTHER PUBLICATIONS

PCT Search Report & Written Opinion, RE: Application No. PCT/US2016/047120, dated Oct. 25, 2016.

*Primary Examiner* — Shaq Taha
(74) *Attorney, Agent, or Firm* — Lori Anne D. Swanson

(57) ABSTRACT

Particular embodiments provide systems and methods to reduce the average power consumption per subscriber. Particular embodiments select windows of time when network components are under-utilized by subscribers of the network. During periods of under-utilization of a network component, subscribers may be consolidated onto a smaller number of network components by increasing the service group size. The consolidation increases the service group size, which has the effect of lowering bandwidth per subscriber. However, the bandwidth use per subscriber may be lower during this time. The use of the smaller number of network components allows the energy for these components to be used more efficiently. When the subscriber network demands increase, the distribution system places the network components into an active power state and redistributes the subscribers to the newly-activated components. This decreases the service group size, such as back to the original size.

21 Claims, 33 Drawing Sheets

(51) Int. Cl.
*H04W 52/04* (2009.01)
*H04W 52/02* (2009.01)

(56) References Cited

U.S. PATENT DOCUMENTS

| | | |
|---|---|---|
| 2007/0201380 A1 | 8/2007 | Ma et al. |
| 2012/0251097 A1 | 10/2012 | Elmardini et al. |
| 2013/0343354 A1* | 12/2013 | Proctor, Jr. .......... H04B 7/2628 370/336 |
| 2014/0169245 A1* | 6/2014 | Kenney ............... H04L 27/2613 370/311 |
| 2014/0254452 A1* | 9/2014 | Golitschek Edler Von Elbwart ..... H04W 52/0216 370/311 |
| 2016/0198461 A1* | 7/2016 | Su .................... H04W 72/0446 370/329 |

* cited by examiner

POWER EFFICIENCY IMPROVEMENT IN NETWORK EQUIPMENT USING SERVICE GROUP CONSOLIDATION

CROSS-REFERENCES TO RELATED APPLICATIONS

The present disclosure claims priority to U.S. Provisional App. No. 62/194,560, filed Jul. 20, 2015, the contents of which is incorporated herein by reference in its entirety.

BACKGROUND

A typical multi-service operator (MSO) plant, such as a 750 MHz hybrid fiber coaxial (HFC) plant, supports around 115 channels. Different services compete for those 115 channels including broadcast and narrowcast services. Broadcast services include analog broadcast and digital broadcast of video content, such as video broadcast for television channels. Narrowcast services include switched digital video, video-on-demand, high speed data, voice, and MSO-managed IP video services.

Typically, a head-end radio frequency (RF) transmitter services a single service group. A service group may be a group of subscribers that share a common set of channels on a single RF transmitter. For example, a first head-end RF transmitter may service a first service group #1 and a second head-end RF transmitter may service a second service group #2. A single HFC distribution system may be created for a single downstream optical wavelength on a single fiber feeding a single fiber node. The fiber node converts the optical signal into an electrical signal on a set of coaxial distribution paths that are fed into multiple homes that make up the subscriber group. Each of the homes therefore receives and shares that bandwidth for those signals. For example, if the signals transport five gigabits per second (Gbps) of bandwidth and there are 500 subscribers (e.g., homes) sharing the bandwidth, then each subscriber has access to an average of 5 Gbps/(500 subscribers)=10 Mbps.

The MSO typically sizes the service groups to ensure there is adequate bandwidth per subscriber during the busier hours of the day when most subscribers are using their highest traffic rates, which may be around 8:00 p.m. to 9:00 p.m. (e.g., the busy hour). Due to this, most likely there is extra or unused bandwidth capacity that is not being used during other portions of the day. For example, there may be very light traffic load between around midnight to 8:00 a.m., or for one-third of the day. Thus, the traffic on the distribution systems for the service groups is thus much lower than the bandwidth capacity that is reserved for the busy hour. Because the MSO would like to provide enough bandwidth for the busy hour, the MSO keeps the service groups at the size such that the distribution system can adequately service each service group during the busy hour. This, however, creates a large amount of time when the distribution systems are not being used efficiently.

DETAILED DESCRIPTION

Described herein are techniques for a power efficient distribution system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

An entity, such as a multi-service operator (MSO), would like to decrease the amount of power being used in their distribution systems (e.g., network networks, HFC networks, etc.) When active, many types of network components, such as channels, amplifiers, circuit packs, chassis, etc., require an amount of power that is largely utilization independent. Particular embodiments provide systems and methods to reduce the average power consumption per subscriber.

Particular embodiments select windows of time when network components are under-utilized by subscribers of the network. The windows may be, for example, when users are not using available network traffic, such as typically in the midnight to 8:00 a.m. time period. During periods of under-utilization of a network component, subscribers may be consolidated onto a smaller number of network components by increasing the service group size. The consolidation increases the service group size, which has the effect of lowering bandwidth per subscriber. However, the average bandwidth use per subscriber may be lower during this time.

The use of the smaller number of network components allows the energy for these components to be used more efficiently. Further, the network components that are no longer needed after the subscriber consolidation process may be removed from service until the service demand increases and requires the use of these removed services. The removal may place the network component into a lower (e.g., low) power state, which uses less power than when the network component is in an active state (e.g., active may be when the component is in use and processing transmitted data to a service group). This removal will decrease the required energy use for the distribution system. When the subscriber network demands increase, the distribution system places the idle network components into an active power state and redistributes the subscribers to the newly-activated components. This decreases the service group size, such as back to the original size.

System Overview

Figure 1:
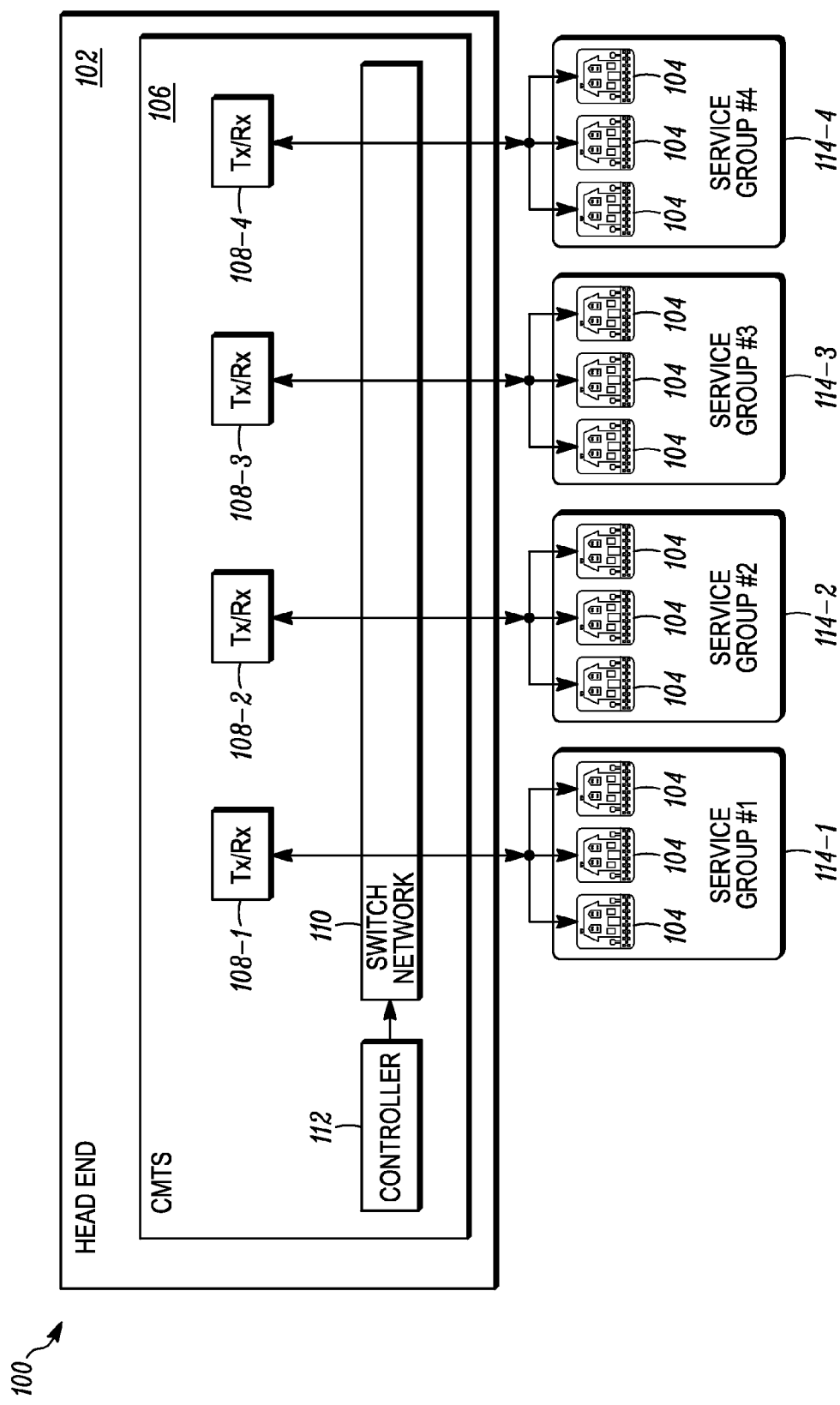
FIG. 1 depicts a simplified system of a distribution network according to one embodiment.

FIG. 1 depicts a simplified system of a distribution network 100 according to one embodiment. Although this implementation of the distribution network system is described, variations will be appreciated. In one embodiment, distribution network includes an HFC network, but other networks include RF cable-based systems, optical systems, wireless systems, and RF over-the-air systems (wireless drop), or any combination may be used. In network 100, a head-end 102 communicates with subscribers 104 that are organized into service groups 114-1-114-4 that are designated as service groups #1, #2, #3, and #4. It will be understood that other numbers of service groups could be provided. Each service group also includes a number of subscribers 104.

Each subscriber 104 may be generally a location or home for a subscriber. Each subscriber location may include customer premise equipment (CPE), such as a cable modem (CM), gateway, and/or a set-top box (STB), that can receive information from head-end 102 and also transmit information to head-end 102.

Head-end 102 includes a cable modem termination system (CMTS) 106. Although one CMTS 106 is shown, head-end 102 may include multiple CMTSs 106 that service other service groups (not shown). A CMTS 106 may provide data services, such as Internet, voice over Internet Protocol (VoIP), analog video services, or digital video services to the subscribers of a cable television (TV) operator. CMTS 106 may include multiple upstream and downstream ports and contain multiple transmitters/receivers (TX/RX) 108, such as radio frequency (RF) transmitters/receivers. Each TX/RX 108 may service a single service group and form a distribution system. Although TX/RX 108 is shown in CMTS 106, particular embodiments may provide transmitters and receivers at different architectural levels of system 100. For example, the transmitters and/or switch network may be included outside of the head-end, such as in a converged cable access platform (CCAP). For discussion purposes, a transmitter 108 will be described, but a person skilled in the art will appreciate how to apply the teaching in the reverse direction for a receiver 108.

A switch network 110, such as a radio frequency (RF) switch, may be used to consolidate service groups to a smaller number of transmitters 108. In this case, the number of subscribers 104 in a service group may be increased. Specific implementations of switch network 110 will be described in more detail below and are not limited to RF components.

A controller 112 may control switch network 110 to perform the consolidation. Controller 112 may monitor traffic dynamically to determine when to trigger consolidation of service groups. For example, controller 112 may monitor traffic counts at various components of network 100. When traffic counts are below a threshold, controller 112 may trigger a consolidation. Various other possible triggers include time-of-day, decrease in total bandwidth utilization on each service group below some pre-specified threshold, quality of experience (QoE) monitors (or quality of service (QoS)) looking at delay and bandwidth and packet loss (indicating an abnormally high QoE), multiple subscriber devices sensing that bandwidth demand has fallen below a threshold, energy cost schedule, determination that the number of active cable modems (CMs) has fallen below a certain threshold (indicating that a sufficiently large number of CMs are idle). Different service group consolidation may be performed based on the monitoring. For example, if very low traffic counts are detected, then extreme service group consolidation may be performed such as consolidating four service groups into one. However, if traffic counts are not extremely low, then controller 112 may consolidate four service groups into two service groups.

To perform the consolidation, controller 112 may switch paths within switch network 110 such that a service group consolidation is performed. When paths are configured in switch network 110, the components in switch network are used to deliver the content to the connected service groups. Once the consolidation takes place, controller 112 may place components of network 100 into a lower power state, such as placing transmitters 108 in the lower power state when they are not servicing a service group. Other components of system 100 may also be placed into a lower power state. For example, RF channels being transmitted/received from an RF port, RF ports (including the associated amplifier hardware chain) within a circuit pack (a.k.a. board, card), circuit packs within a device (a.k.a. chassis), devices (chassis) within a headend, network links within a Link Aggregation Group (LAG) may be placed into a lower power state.

Switch network 110 may exist at different architectural levels of system 100. Switch network 110 may implement dynamic steering of signals, and may be in a separate chassis from transmitters 108 or can be integrated into the same chassis as transmitters 108. Controller 112 may be in a separate chassis from RF transmitters 108 or can be integrated into the same chassis as transmitters 108. Further, controller 112 may be integrated into the same chassis as switch network 110. Controller 112 may include various circuits to implement the changing of paths in switch network 110.

In one example, a cable access module (CAM) card may include switch network 110. A CAM card may include multiple transmitters 108 on a single blade for CMTS 106. Each CAM card may include N amplifiers/ports. Switch network 110 may consolidate channels from being spread over N amplifiers/ports to some smaller number of amplifiers/ports. The consolidation may be formulated, as appropriate, and cause a gradual transition to a single (larger) service group based on the loading (or other information as noted). In this case, power consuming resources in one or more service groups would be de-activated over time as opposed to all at once. The CAM card may be configured such that power would be saved when the amplifiers are placed into a lower power state. If enough consolidation is possible, entire CAM cards may be placed into a lower power state with the remainder of the CAM cards being used to service the remaining subscribers 104.

Also, switch network 110 may be used to reconfigure the number of RF channels that are available to be used for one or more cable bonding groups. Switch network controller 112 may configure switch network 110 to temporarily reduce the number of channels that are available for a cable bonding group when the service groups are consolidated and may then return to the original bonding configuration when service groups are unconsolidated. A cable bonding group may be where the individual packets associated with a particular channel (or program) are able to be directed to any one of several RF channels (known as "bonded channels"). Thus, the union of those bonded channels is known as a "bonding group", and the bonding group creates a higher-bandwidth path over which the individual packets can be transmitted. Switch network 110 may be configured such that the number of bonded channels may be reduced within the bonding group.

For the concept of a dynamically changing Link Aggregation Group, controller 112 automatically shuts down some members of a LAG when a trigger indicates that system utilization has become sufficiently low (keeping at least the configured minimum number of links in the LAG active). Also, controller 112 automatically restores members of a LAG when a trigger indicates that system utilization has become sufficiently high.

The action of dynamically increasing the service group size may be performed on a per-channel basis, on a port basis, on a per-card basis, or on a per-chassis basis. This provides power saving benefits in all cases as long as any circuitry that transmits and/or receives for a service group can be placed in a lower power state when that service group is combined with another service group that is serviced by other circuitry associated with the other service group. The lower power state may use less power than the active state.

When there are changes to the network topology, components higher up, and lower down in the data transport and routing hierarchy may need to reconfiguration as well. Changes such as these might include devices which change Internet Protocol (IP) routes to different cards, and, possibly even routers feeding an entire Converged Cable Access Platform (CCAP) if an entire CCAP becomes consolidated with others. Below the CCAP, the CMs may need to adapt to the new configuration, for example, the number of bonded channels might change, the frequencies which carry the data channels may change, etc. Even within a card, single components may serve several service groups. These too may require reconfiguring. Particular embodiments may use advanced signaling to subscriber devices to preconfigure the parameters needed for the consolidation or redistribution back to the original service groups.

Cable modems in a service group that are consolidated into another service group, and thus a new transmitter 108, might experience a short outage due to several reasons (e.g., the cable modems are moved to a different media access control (MAC) domain, there might be a short outage of service on the RF circuit feeding the cable modems, or the cable modems may experience a change in power, delay, or frequency from the new transmitter 108). The cable modems may therefore need to rearrange and/or re-register with the new transmitter 108, but this may take only a short amount of time that may not be noticeable.

If the RF channels onto which subscribers are consolidated are shared by multiple MAC domains, then the users may not experience an outage at all when consolidated or redistributed. Also, particular embodiments may provide advanced signaling to all subscriber devices to preconfigure the parameters for either a consolidation or redistribution event before that event happens. This switch is intended to reach steady, operational state quickly.

Different embodiments for system 100 will now be described. This includes switching on a CAM card level, and switching on a network that includes circuitry for both re-sparing and service group consolidation.

Combining on a CAM Card Level

Controller 112 may dynamically increase the size of a service group by changing the physical switches in switch network 110 for RF signals from transmitter 108 to reach more service groups. This may be accomplished using RF switching configurations with components of various types, such as switches, field effect transistor (FET) switches, splitters, and amplifiers, etc. Although RF is described, it will be understood that components to distribute other types of signals may be used.

Before Service Group Consolidation

Figure 2:
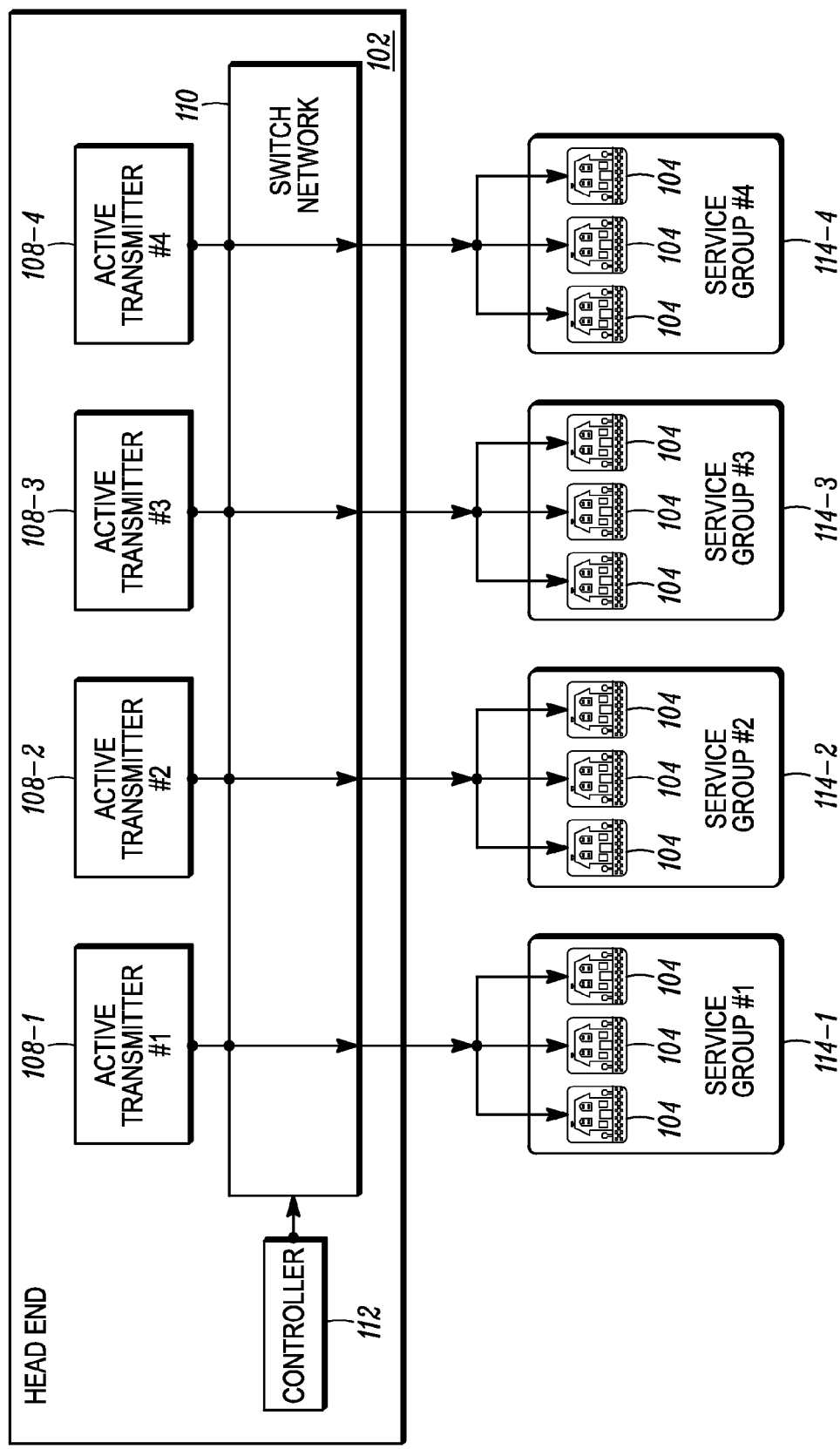
FIG. 2 depicts an example of the system before service group consolidation according to one embodiment.

FIG. 2 depicts an example of system 100 before service group consolidation according to one embodiment. In this example, only transmitters are shown. However, the system may also be bi-directional in which the service groups may be consolidated for receivers. A person of skill in the art will appreciate the consolidation in the other direction.

As shown, four active transmitters 108-1-108-4 are shown and identified as transmitters #1-#4. Each active transmitter serves one or more channels to a single service group shown as service group #1-service group #4. For example, transmitter #1 services service group #1, transmitter #2 services service group #2, etc. That is, a single transmitter services a single service group. The transmitters, components in switch network 110, and subscriber equipment may all be considered network components, and can be placed into a lower power state to reduce power. The following will describe the placing of transmitters into a lower power state, but other components that are not used after the consolidation may also be placed into a lower power state to save power.

In this example, service group consolidation has not been performed, and all transmitters 108 are active and consuming power. If power per transmitter (Pt) is calculated, then the total power consumed is approximately 4*Pt, which indicates that power per transmitter for all four transmitters is being consumed.

After Service Group Consolidation

Figure 3:
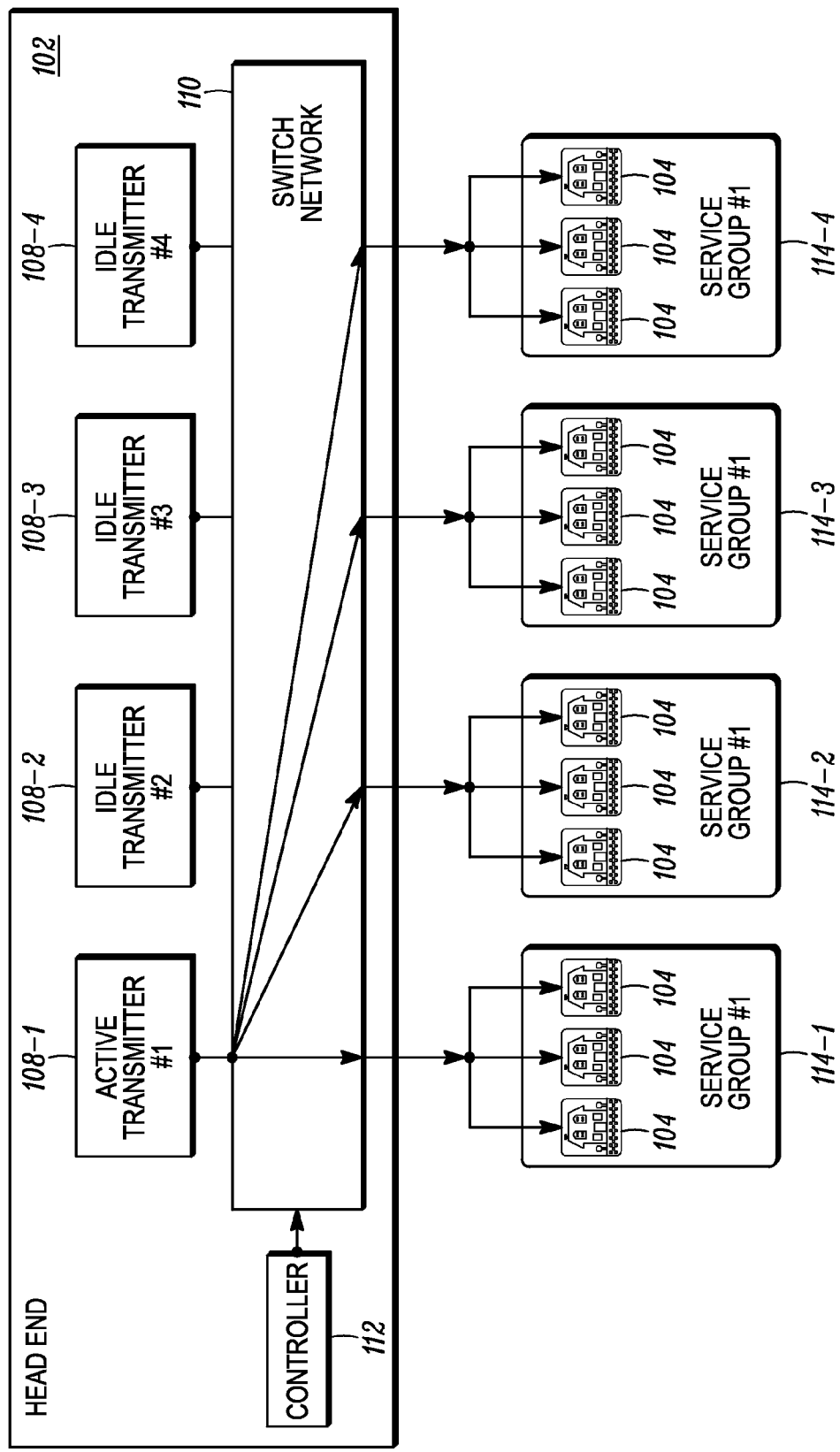
FIG. 3 depicts an example of a switch network after service group consolidation according to one embodiment.

FIG. 3 depicts an example of switch network 110 after service group consolidation according to one embodiment. Controller 112 may manage switch network 110 to consolidate service groups to transmitter 108-1. As shown, the connection through switch network 110 couples transmitter #1 to all service groups #1, #2, #3, and #4 at 114-1-114-4. All subscribers 104 are now served in the same service group #1. Thus, previous service groups #2, #3, and #4 no longer exist anymore.

Transmitters #2, #3, and #4 are now idle and not consuming power. Transmitters #2, #3, and #4 are now idle. In this case, controller 112 may place transmitters #2-#4 into a lower power state. The total power consumed is thus 1*Pt for just transmitter #1. However, the bandwidth per subscriber is reduced by a factor of 4 due to only one transmitter now servicing all subscribers 104.

Consolidation into Two Service Groups

Figure 4:
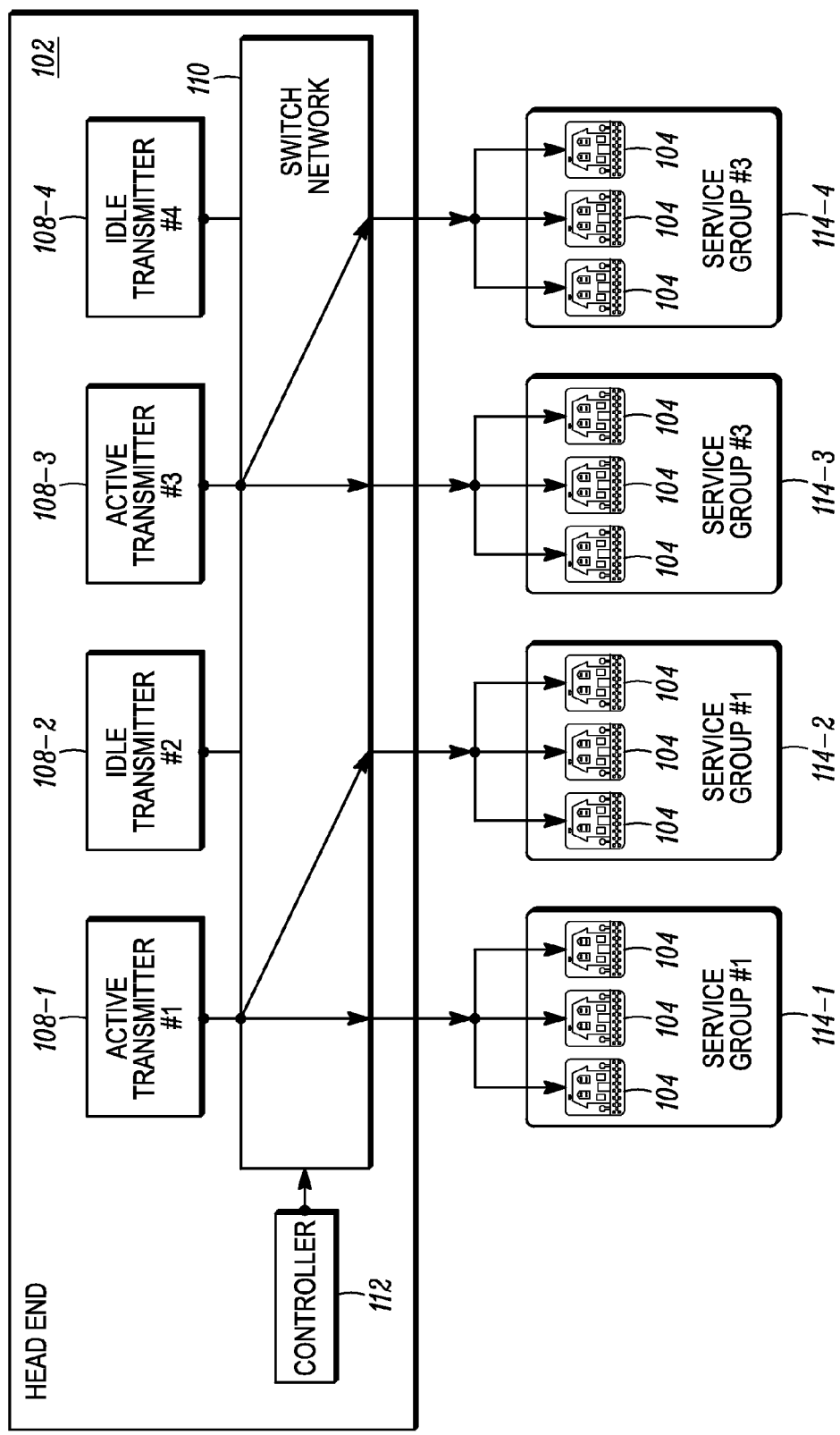
FIG. 4 depicts an example of consolidating service groups into multiple service groups instead of one service group according to one embodiment.

Controller 112 may consolidate the service groups into different numbers of service groups. FIG. 4 depicts an example of consolidating service groups into multiple service groups instead of one service group according to one embodiment. Controller 112 reconfigures switch network 110 to couple service group #1 (shown at 114-1) and previous service group #2 (shown as service group #1 at 114-2) to transmitter #1, and also couple service group #3 and previous service group #4 (shown as service group #3 at 114-4) to transmitter #3. Accordingly, the service group at 114-2 has been consolidated into service group #1 and the service group at 114-4 has been consolidated into service group #3. This increases the size of service group #1 and service group #3 while service group #2 and service group #4 have been removed.

In this example, transmitters #1 and #3 are active and consuming power and transmitters #2 and #4 have been placed into a lower power state and are not consuming power. Transmitters #2 and #4 can be placed into a lower power state due to removing service group #2 and service group #4 from service. The total power being consumed is thus 2*Pt, but the bandwidth per subscriber has been reduced by a factor of 2.

Network Switch Implementations

Figure 5:
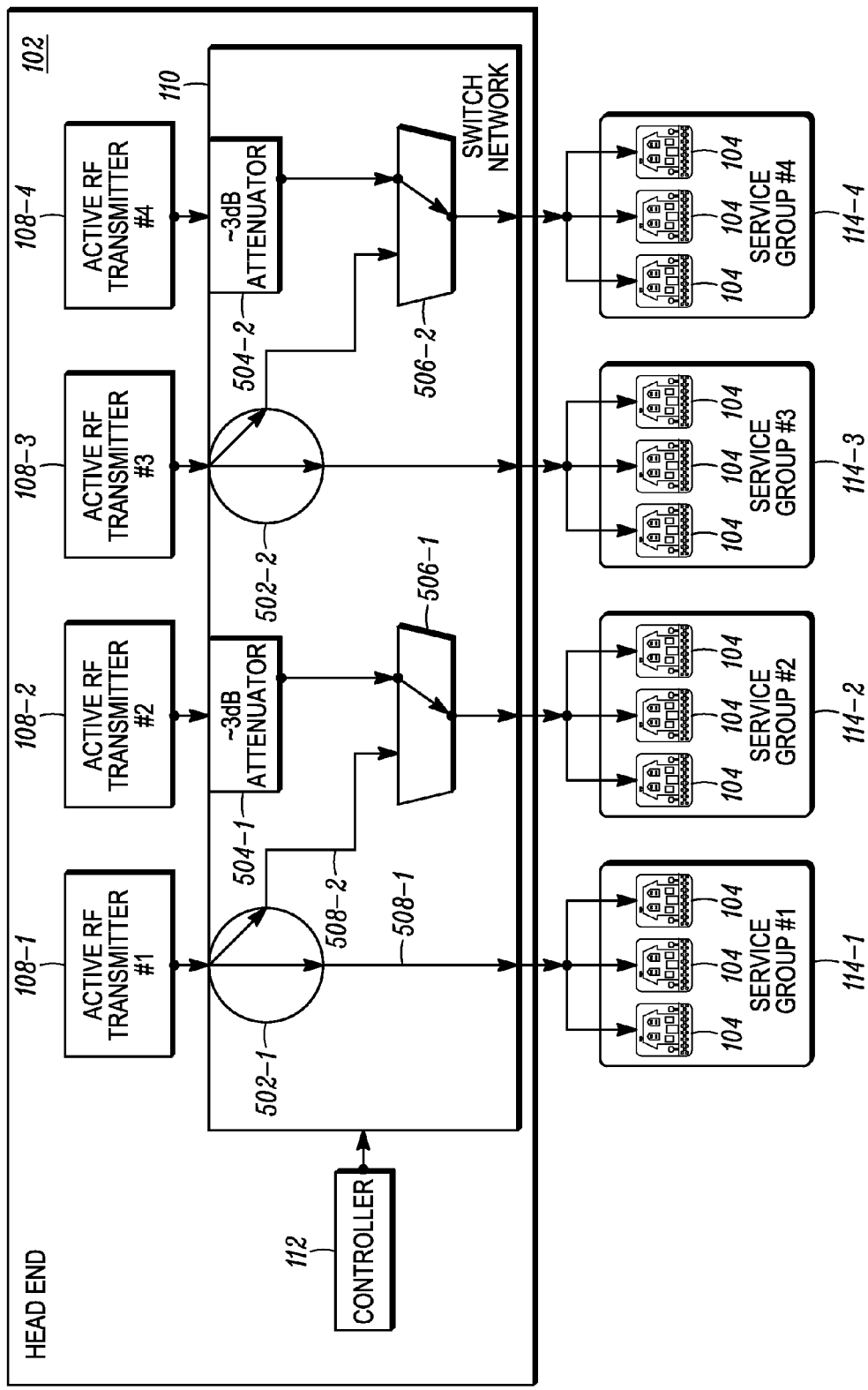
FIG. 5 depicts an example implementation for the switch network corresponding to the configuration of FIG. 4 according to one embodiment.

Different implementations of switch network 110 may be used. The following will describe different circuits, but it will be recognized that variations of these circuits will also be appreciated. FIG. 5 depicts an example implementation for switch network 110 corresponding to the configuration of FIG. 4 according to one embodiment. In FIG. 5, the consolidation has not yet occurred. For example, service groups #1-#4 are being serviced individually by transmitters #1-#4, respectively.

Switch network 110 includes a first splitter 502-1, a second splitter 502-2, a first attenuator 504-1, a second attenuator 504-2, a first switch 506-1 and a second switch 506-2. Splitters 502 may receive a signal and split it into a number of different paths. As shown, splitter 502 splits a path from transmitter #1 into two paths, one to service group #1 at 508-1 and a second one to a switch 506-1 at 508-2. In this case, switch 506-1 (e.g., a RF switch or other type of switch) may be switched between two different paths from either transmitter #1 or transmitter #2. In this example, switch 506-1 is switched such that a path from transmitter #1 to service group #2 is not coupled together. Rather, transmitter #2 is coupled to service group #2.

Transmitter #2 may send signals through attenuator 504-1, which may be a ~3 dB attenuator. The ~3 dB attenuation is performed to reduce the power of the signal of active transmitter #2. Splitter 502-1 may introduce a ~3 dB power loss to service group #1. To make sure that the power is the same for all service groups before and after the consolidation, the ~3 dB attenuation approximates that the signals from transmitter #1 are at the same power level as the signals from transmitter #2. In this path, transmitter #2 transmits signals through attenuator 504 and switch 506-1 to service group #2. For service groups #3 and #4, the same structure is provided through splitter 502-2, attenuator 504-2, and switch 506-2.

Figure 6:
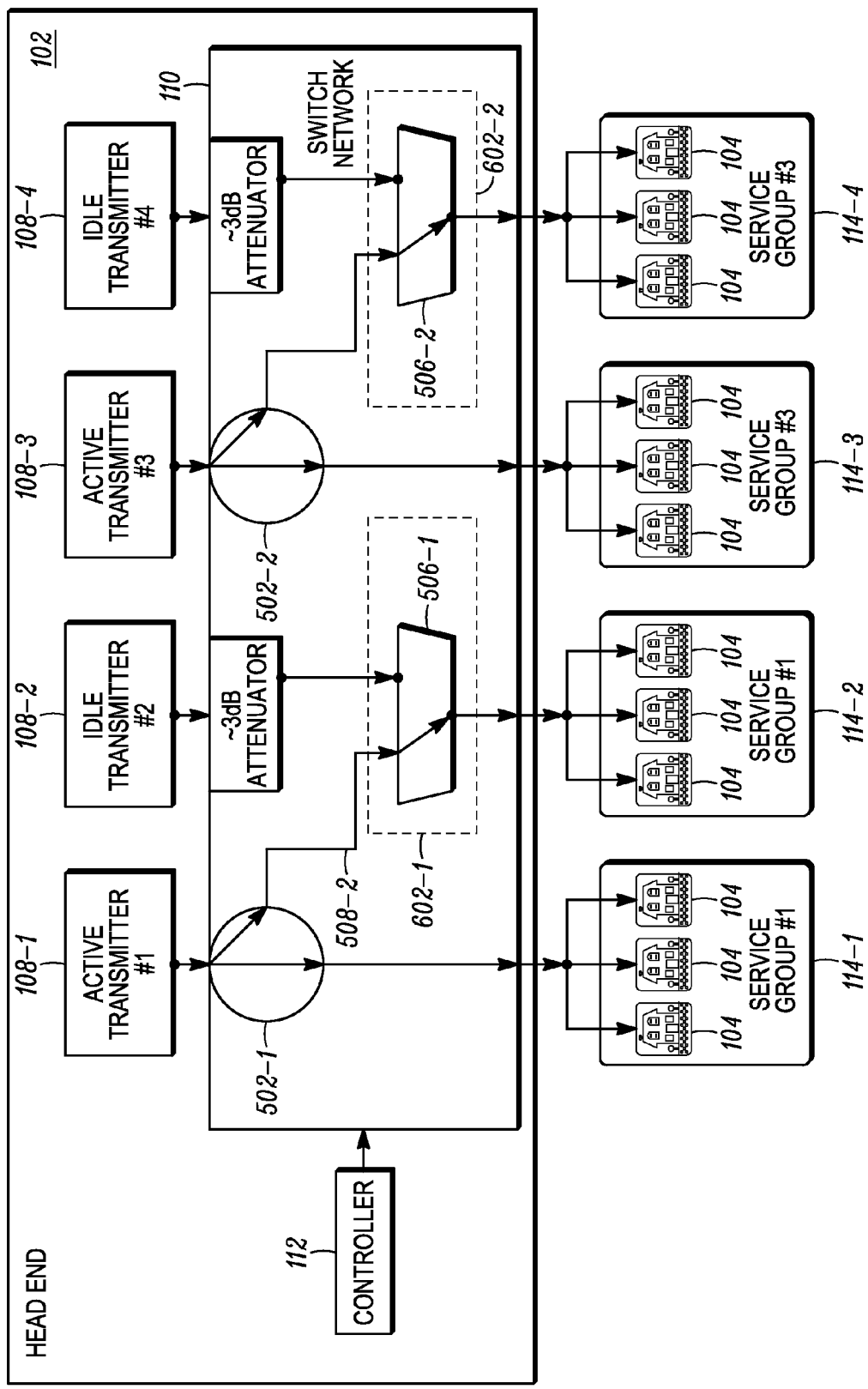
FIG. 6 shows an example of the switch network when service group consolidation is performed for the implementation of FIG. 5 according to one embodiment.

FIG. 6 shows an example of switch network 110 when service group consolidation is performed for the implementation of FIG. 5 according to one embodiment. In this case, previous service group #2 at 114-2 has been consolidated with service group #1. Also, previous service group #4 at 114-4 has been consolidated into service group #3.

To perform the consolidation, switch 506-1 and switch 506-2 have been switched by controller 112 to a different path. For example, in a dotted box 602-1, switch 506-1 has been switched to couple to transmitter #1 through splitter 502-1 to service group #1 at 114-2. Further, in a dotted box 602-2, switch 506-2 has been switched to couple to transmitter #3 through splitter 502-2 to service group #3 at 114-4.

Transmitters #1 and #3 are active transmitters and controller 112 has placed transmitter #2 and transmitter #4 into a lower power state. The new path from transmitter #1 to service group #1 at 114-2 shares splitter 502-1 with the path from transmitter #1 to service group #1 at 114-1. This provides efficient use of network components. However, it will be understood that variations of the paths may be appreciated, and in some variations, no sharing of components are necessary. As described above, the service groups have been consolidated and half the power is now used. There is also a ~3 dB loss at all times.

Attenuator 504 ensures that the RF signal power output level for service groups #2 and #4 are at the same level before and after the consolidation. That is, the RF signal power output matches the loss at the splitter 502. An alternate method to achieve this match is to add a power amplifier before each splitter 502 such that no ~3 dB loss is seen at all.

Figure 7A:
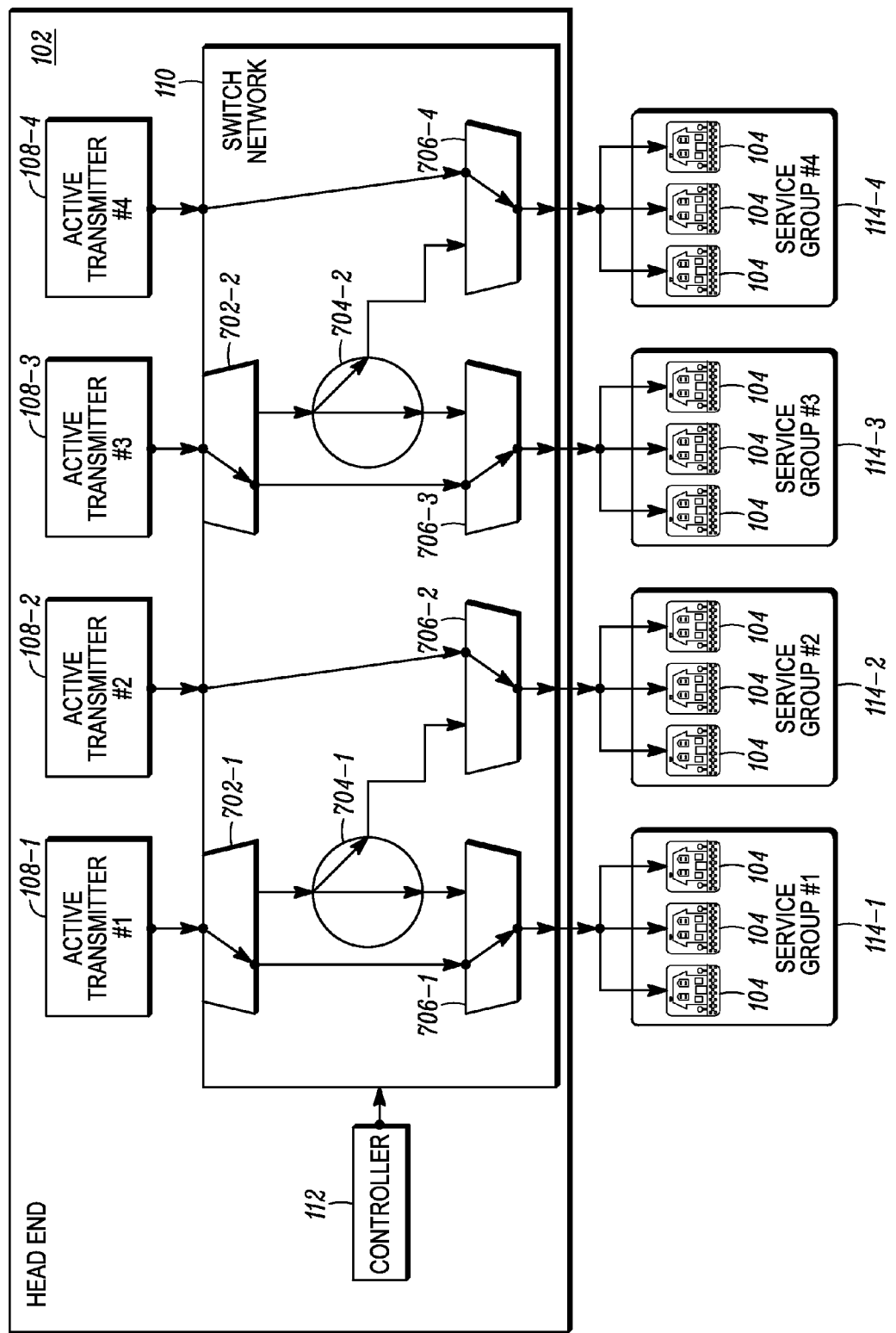
FIG. 7A depicts an example of the switch network before consolidation in an implementation that has a ~3 dB loss only when consolidation is performed according to one embodiment.
Figure 7B:
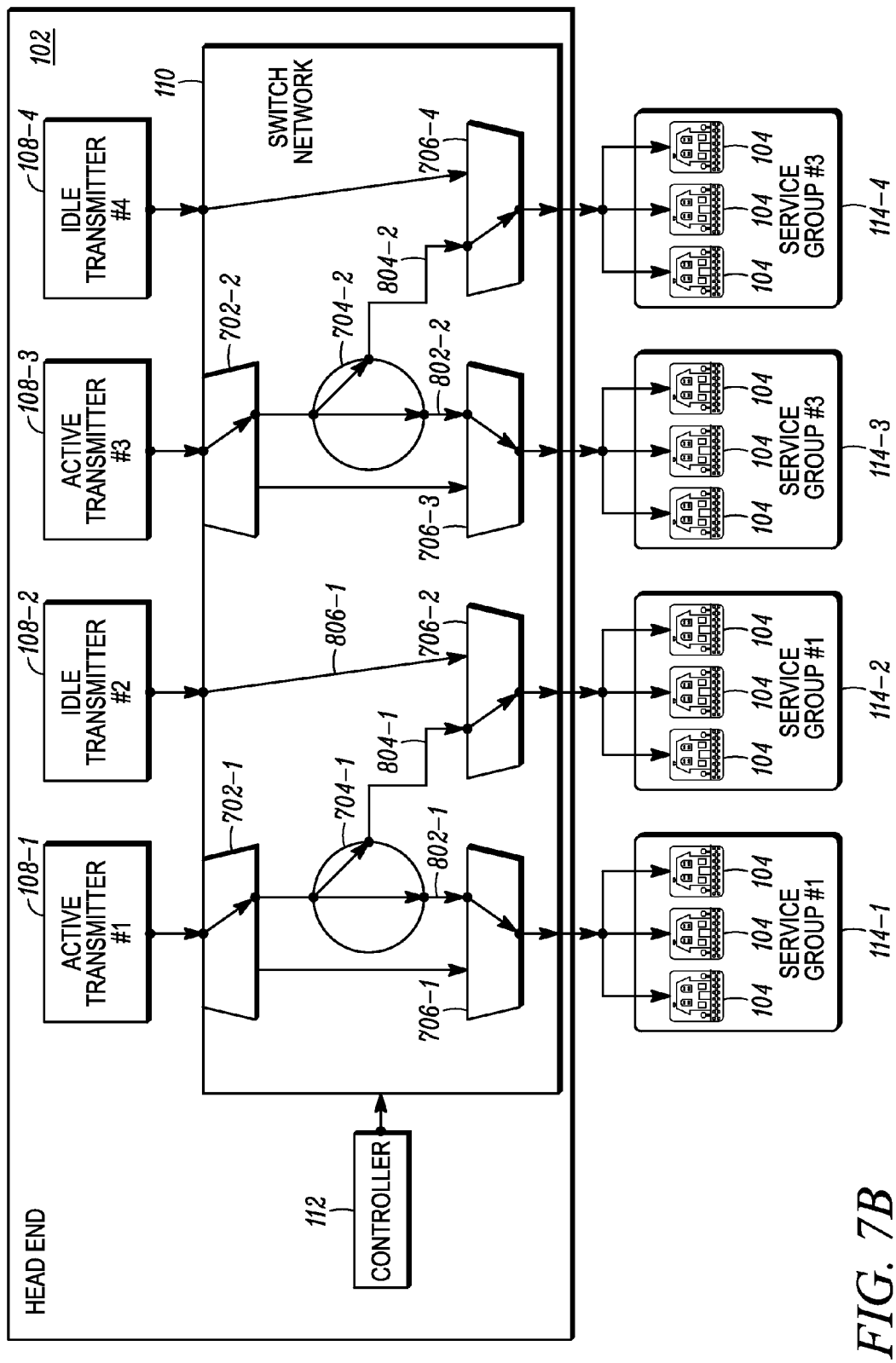
FIG. 7B depicts an example of implementation of the switch network shown in FIG. 7A after service group consolidation according to one embodiment.

FIGS. 7A and 7B show an implementation where the ~3 dB loss at all times may be changed to be present only when the service group consolidation is performed. FIG. 7A depicts an example of switch network 110 before consolidation in an implementation that has a ~3 dB loss only when consolidation is performed according to one embodiment. Switch network 110 includes a switches 702-1 and 702-2, splitters 704-1 and 704-2, and switches 706-1-706-4.

In FIG. 7A, service group consolidation has not been performed yet. For example, the path from transmitter #1 to service group #1 is through switch 702-1 to switch 706-1. The path through splitter 704-1 is not used. Because splitter 704-1 is not part of the path from transmitter #1 to service group #1, a ~3 dB loss is not experienced in the signal. Also, the path from transmitter #2 goes through switch 706-2 to service group #2. Similar paths exist for transmitter #3 to service group #3 and transmitter #4 to service group #4, respectively.

Splitters 704 are introduced into the paths after consolidation, however. FIG. 7B depicts an example of implementation of switch network 110 shown in FIG. 7A after service group consolidation according to one embodiment. In this case, previous service group #2 at 114-2 has been consolidated into service group #1 and previous service group #4 at 114-4 has been consolidated into service group #3. The service group #1 at 114-2 is now serviced by transmitter #1 and service group #3 at 114-4 is now serviced by transmitter #3.

In this example, all switches 702 and 706 are changed. For transmitter #1, a first path to service group #1 at 114-1 goes through switch 702-1 to splitter 704-1. Then, splitter 704-1 sends a signal in a path at 802-1 to switch 706-1. From switch 706-1, the signal is sent to service group #1 at 114-1. For service group #1 at 114-2, the signal from transmitter #1 is forwarded through switch 702-1 to splitter 704-1. Splitter 704-1 now splits the signal in a different path shown at 804-1 to switch 706-2. Switch 706-2 then forwards the signal to service group #1 at 114-2. In both paths to service groups #1 at 114-1 and 114-2, the ~3 dB loss is experienced due to splitter 704-1. For transmitter #3, the same logic occurs using switch 702-2, splitter 704-2, switch 706-3, and switch 706-4.

As is shown, a path from transmitter #2 and a path from transmitter #4 to any service groups are not used. Thus, controller 112 can place transmitters #2 and #4 into a lower power state.

In the above, splitter 704-1 and splitter 704-2 are only active in the path when the service group consolidation is provided. In this case, the ~3 dB loss is only experienced during service group consolidation. Thus, a ~3 dB attenuator is not needed in the path from transmitter #2 to service group #2 (service group #1 at 114-2) and from transmitter #4 to service group #4 (service group #3 at 114-4). Also, in this example, half the power is used as described above.

Figure 8A:
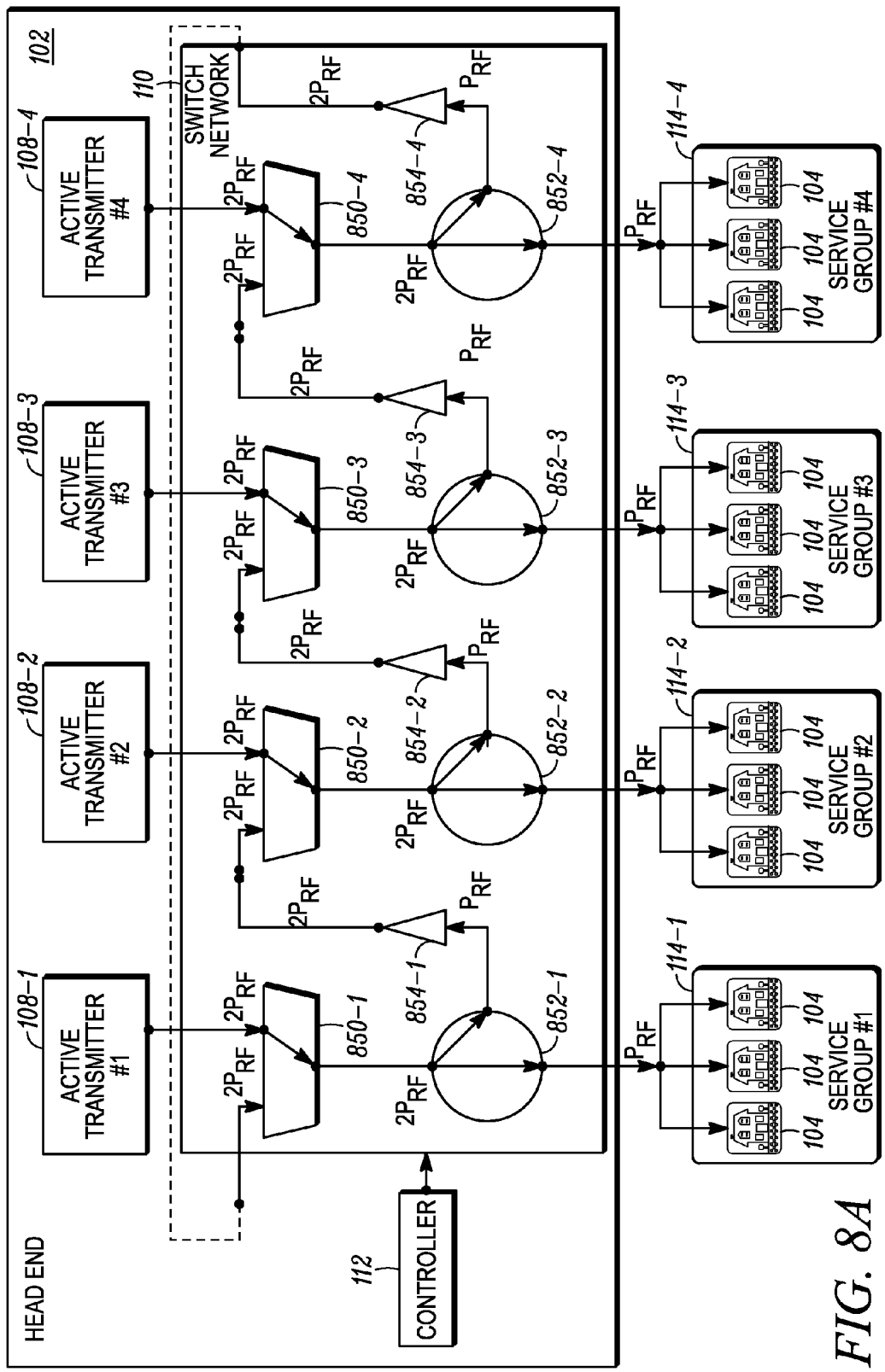
FIG. 8A depicts an example of the switch network before consolidation in an implementation that has no loss when consolidation is performed according to one embodiment.

FIGS. 8A-8F show another implementation where there is no power loss when the service group consolidation is performed according to one embodiment. FIG. 8A depicts an example of switch network 110 before consolidation in an implementation that has no loss (e.g., RF power loss) when consolidation is performed according to one embodiment. Switch network 110 includes a switches 850-1-850-4, splitters 852-1-852-4, and amplifiers 854-1-854-4.

In FIG. 8A, service group consolidation has not been performed yet. For example, the path from transmitter #1 to service group #1 is through switch 850-1 to splitter 852-1. The power going into switch 850-1 is $2P_{RF}$, which means twice the RF power is being transmitted by transmitter #1 to service group #1. The power going into service group #1 is $P_{RF}$. Similar paths exist for transmitter #2 to service group #2, transmitter #3 to service group #3 and transmitter #4 to service group #4, respectively.

Figure 8B:
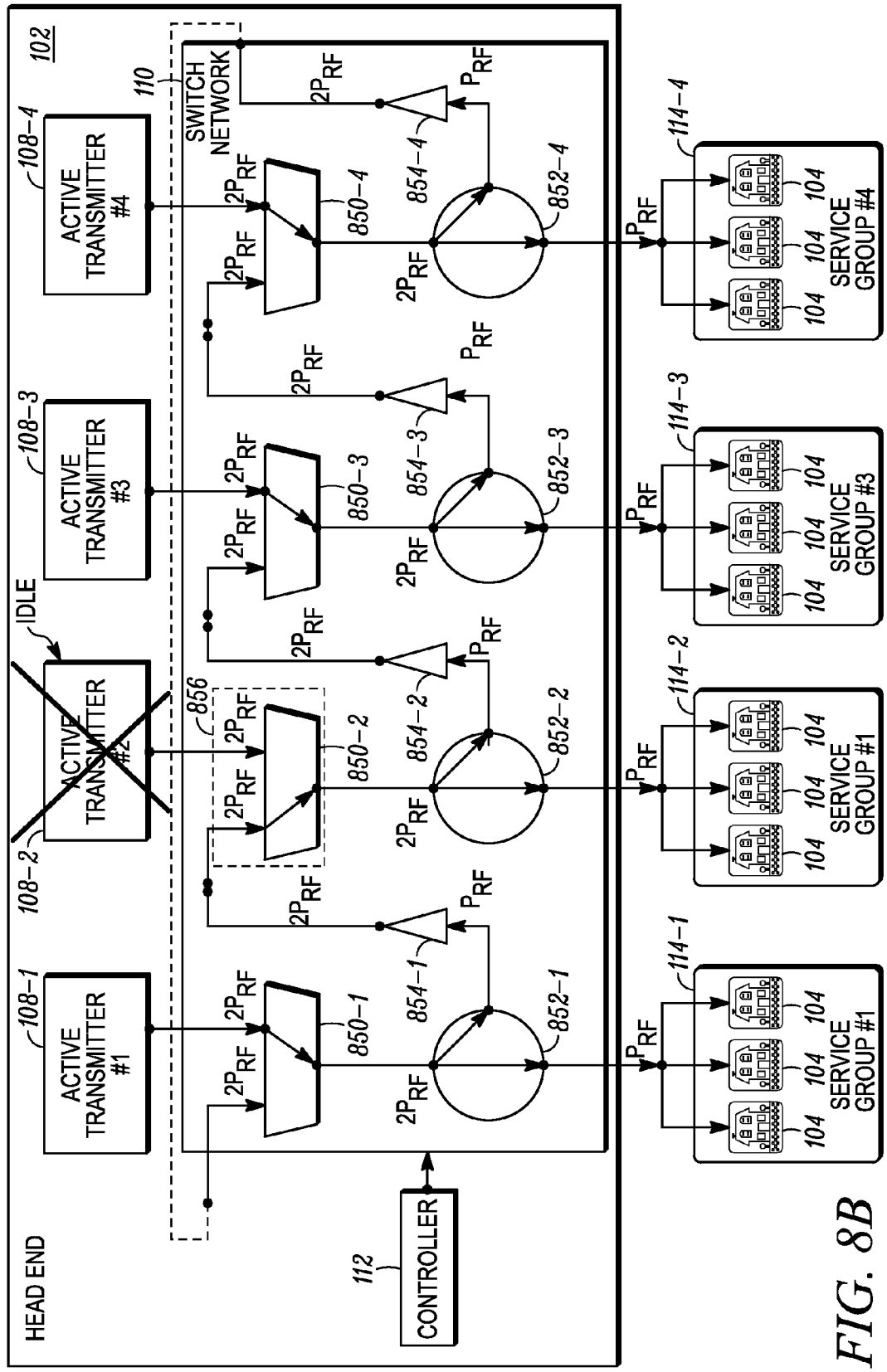
FIG. 8B depicts an example of implementation of the switch network shown in FIG. 8A after service group consolidation of one service group according to one embodiment.

FIG. 8B depicts an example of implementation of switch network 110 shown in FIG. 8A after service group consolidation of one service group according to one embodiment. In this case, previous service group #2 at 114-2 has been consolidated into service group #1. The service group #1 at 114-2 is now serviced by transmitter #1.

In this example, in dotted box 856, switch 850-2 has changed. For transmitter #1, a first path to service group #1 at 114-1 goes through switch 850-1 to splitter 852-1 and then to service group #1 at 114-1. Also, splitter 852-1 sends a signal in a path through amplifier 854-1, which amplifies the power of the signal from $P_{RF}$ to $2P_{RF}$. From switch 850-2, the signal is sent to splitter 852-2, and then to service group #1 at 114-2 (previous service group #2). The power of the signal sent to service groups #1 at 114-1 and 114-2 is $P_{RF}$. In both paths to service groups #1 at 114-1 and 114-2, the ~3 dB loss is experienced due to splitters 852-1 and 852-2.

As is shown, a path from transmitter #2 is not used. Thus, controller 112 can place transmitter #2 into a lower power state. In the above, the power loss from using two splitters 852-1 and 852-2 is compensated for by amplifier 854-1.

Figure 8C:
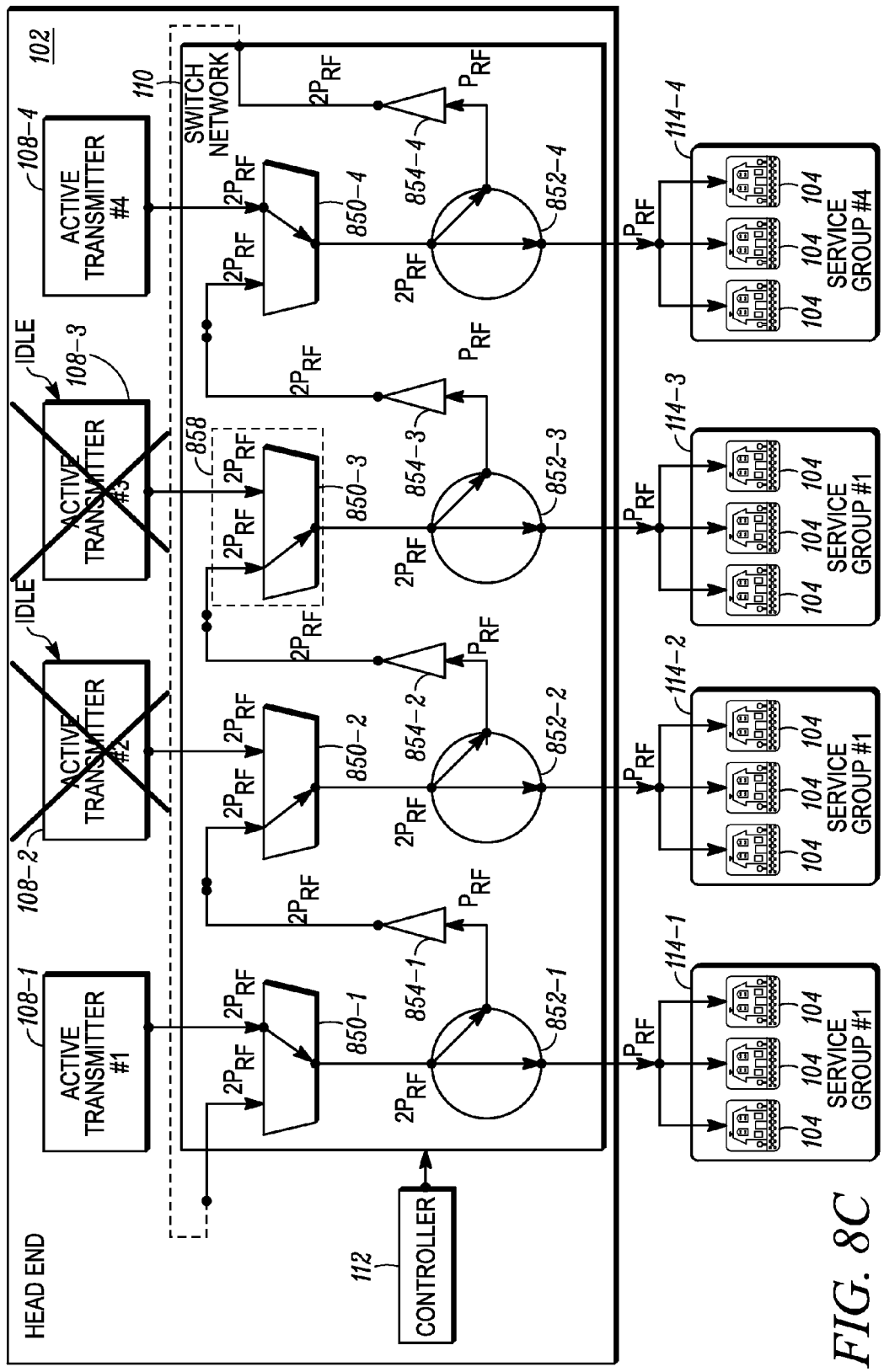
FIG. 8C depicts an example of implementation of the switch network shown in FIG. 8A after service group consolidation for two service groups according to one embodiment.

FIG. 8C depicts an example of implementation of switch network 110 shown in FIG. 8A after service group consolidation for two service groups according to one embodiment. In this case, previous service group #2 at 114-2 and previous service group #3 at 114-3 have been consolidated into service group #1. The service groups #1 at 114-2 and 114-3 are now serviced by transmitter #1.

In this example, in dotted box 858, switch 850-3 has changed. The same configuration for service group #1 at 114-2 described in FIG. 8B is provided. For transmitter #1, a first path to service group #1 at 114-1 goes through switch 850-1 to splitter 852-1 and then to service group #1 at 114-1. Also, splitter 852-1 sends a signal in a path through amplifier 854-1, which amplifies the power of the signal from $P_{RF}$ to $2P_{RF}$. From switch 850-2, the signal is sent to splitter 852-2, and then to service group #1 at 114-2 (previous service group #2). Further, splitter 852-2 sends a signal in a path through amplifier 854-2, which amplifies the power of the signal from $P_{RF}$ to $2P_{RF}$. From switch 850-3, the signal is sent to splitter 852-3, and then to service group #1 at 114-3 (previous service group #3). The power of the signal sent to service groups #1 at 114-1, 114-2 and 114-3 is $P_{RF}$. In all three paths to service groups #1 at 114-1, 114-2 and 114-3, the ~3 dB loss is experienced due to splitters 852-1, 852-2, and 852-3.

As is shown, a path from transmitter #2 and transmitter #3 are not used. Thus, controller 112 can place transmitters #2 and #3 into a lower power state. In the above, the power loss from using two splitters 852-1, 852-2, 852-3 is compensated for by amplifier 854-1.

Figure 8D:
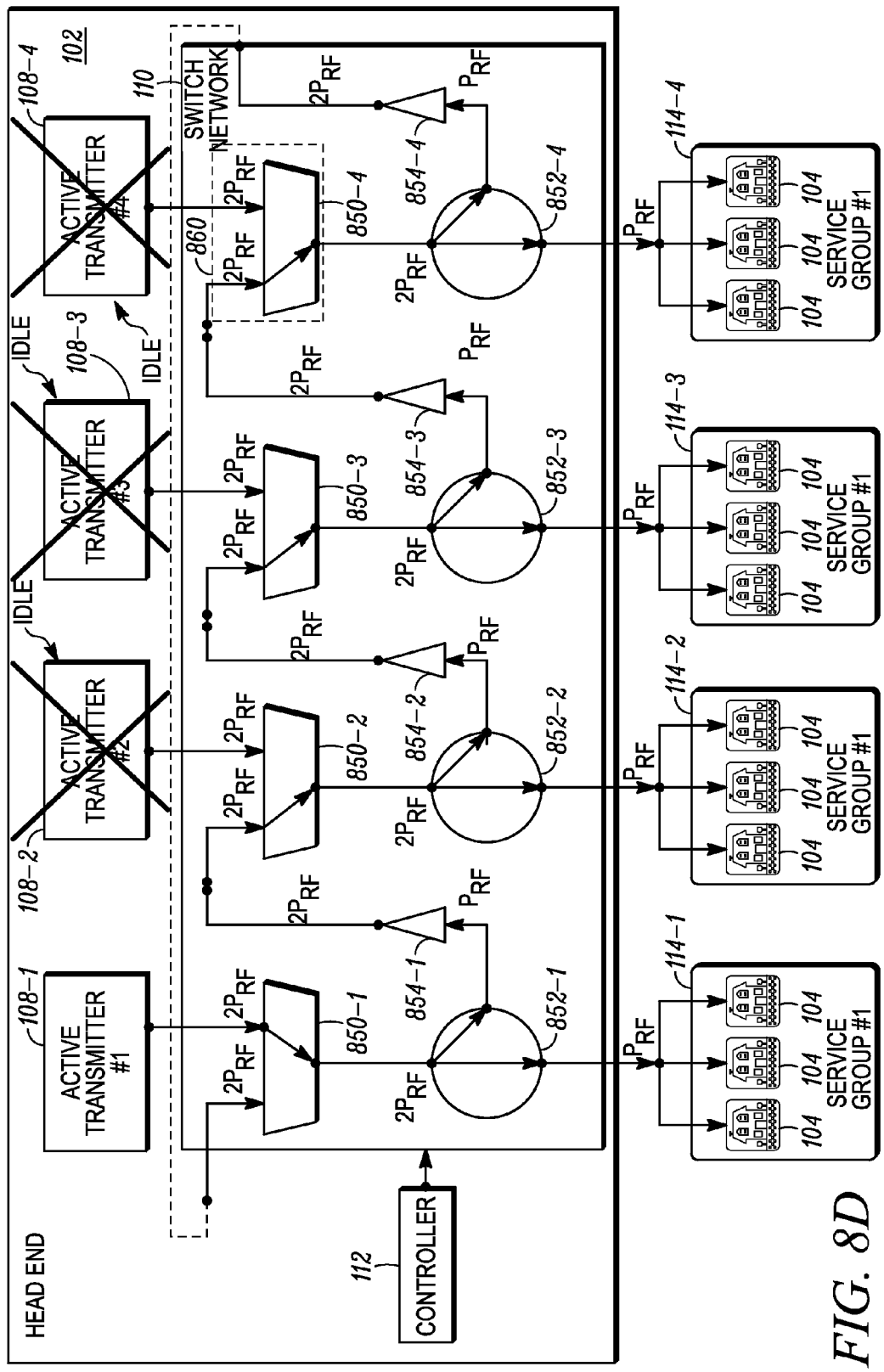
FIG. 8D depicts an example of implementation of the switch network shown in FIG. 8A after service group consolidation for three service groups according to one embodiment.

FIG. 8D depicts an example of implementation of switch network 110 shown in FIG. 8A after service group consolidation for three service groups according to one embodiment. In this case, previous service group #2 at 114-2, previous service group # at 114-3, and previous service group #4 at 114-4 have been consolidated into service group #1. The service groups #1 at 114-2, 114-3, and 114-4 are now serviced by transmitter #1.

In this example, in dotted box 860, switch 850-4 has changed. The same configuration for service group #1 at 114-2 described in FIG. 8B is provided. The connection is similar to that described above and switch 850-4 is now switched such that transmitter #1 services service group #1 at 114-4.

Figure 8E:
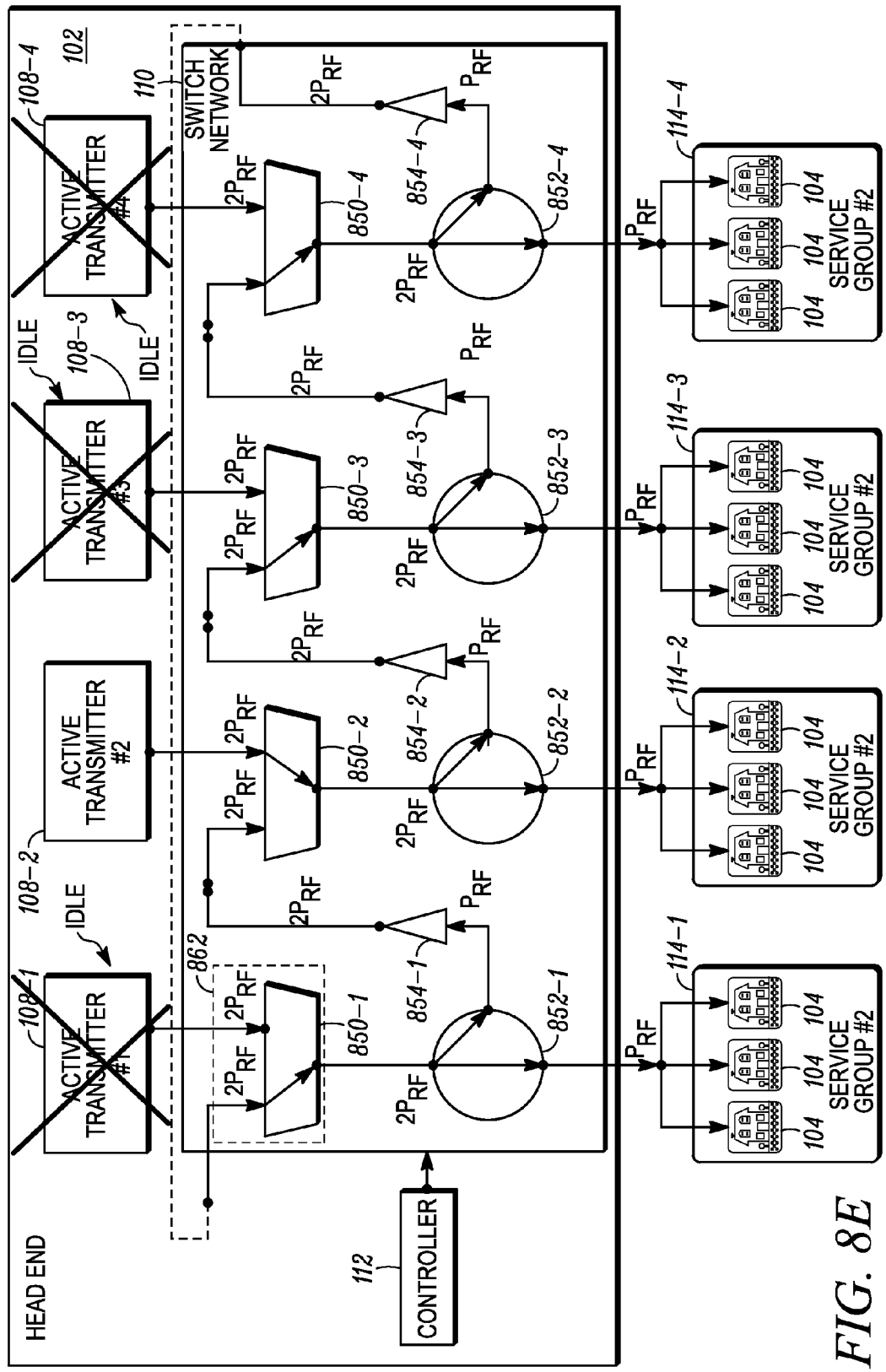
FIG. 8E depicts an example of implementation of the switch network shown in FIG. 8A after service group consolidation with transmitter #2 active according to one embodiment.

FIG. 8E depicts an example of implementation of switch network 110 shown in FIG. 8A after service group consolidation with transmitter #2 active according to one embodiment. In this case, previous service group #1 at 114-1, previous service group #3 at 114-3, and previous service group #4 at 114-4 have been consolidated into service group #2. The service groups #2 at 114-1, 114-3, and 114-4 are now serviced by transmitter #2.

In this example, in dotted box 862, switch 850-1 has changed. The same configuration for service groups #1 at 114-3 and 114-4 described in FIG. 8D is provided. However, in this case, the signal from transmitter #2 is provided through splitter 852-4, amplifier 854-4, back to switch 850-1 in circular logic. Then, the signal is sent through splitter 852-1 to service group #2 at 114-1.

Figure 8F:
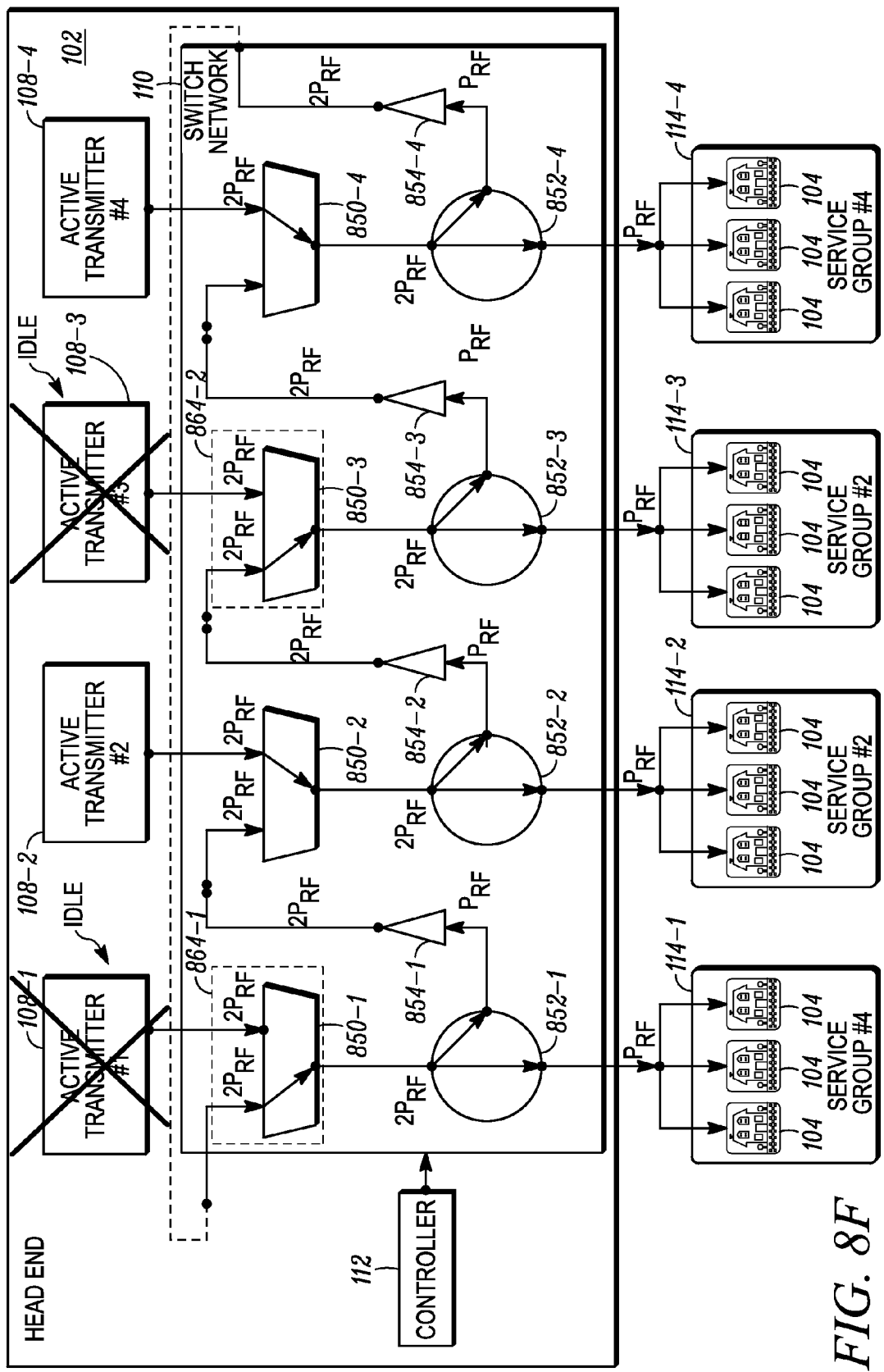
FIG. 8F depicts an example of implementation of the switch network shown in FIG. 8A after service group consolidation into two different service groups according to one embodiment.

FIG. 8F depicts an example of implementation of switch network 110 shown in FIG. 8A after service group consolidation into two different service groups according to one embodiment. In this case, previous service group #1 at 114-1 is consolidated into service group #4 and previous service group #3 at 114-3 is consolidated into service group #2. The service group #2 is serviced by transmitter #2 and the service group #4 is serviced by transmitter #4. Transmitters #1 and #4 are placed in a lower power state. In this example, in dotted box 864-1, switch 850-1 has changed to couple it to transmitter #4. Also, in dotted box 864-2, switch 850-3 has changed to couple it to transmitter #2.

In all of the above examples, amplifiers 854 are added such that there is no power loss when consolidation occurs. That is the same power level of $P_{RF}$ send experienced at the service groups both before and after consolidation.

It will be understood that switch network 110 may be controlled to dynamically consolidate service groups to encompass different ratios. Also, the above examples were for downstream signals. Similar circuitry can be designed for upstream signals steered from a consolidated service group to RF receivers, and a person of skill in the art would be able to create circuits for switch network 110 in the upstream direction.

Service Group Consolidation in Conjunction with Re-Sparing

Sparing circuitry (e.g., RF sparing circuitry) may be integrated into CTMS 106. For example, the sparing circuitry may be integrated into a chassis that includes transmitter 108 to permit a spare card to take over for a faulty card whenever a fault is detected. This increases the system availability and is usually accomplished by steering RF signals from the spare card to a connector previously connected to the card that became faulty. Particular embodiments may combine the circuitry for sparing with circuitry for service group consolidation in an improved way that may reduce the number of components in switch network 110. This reduces the number of connectors and RF traces required to support both sparing and dynamic service group consolidation if the two functions can be combined. The following will show three different types of RF sparing circuits, but other sparing circuits may be used. The following may be used to allow a plurality of cards to take up the load from a plurality of other cards, which can not only reduce power, but also be used to compensate for card failure scenarios.

Traditional N+1 Sparing

Figure 9:
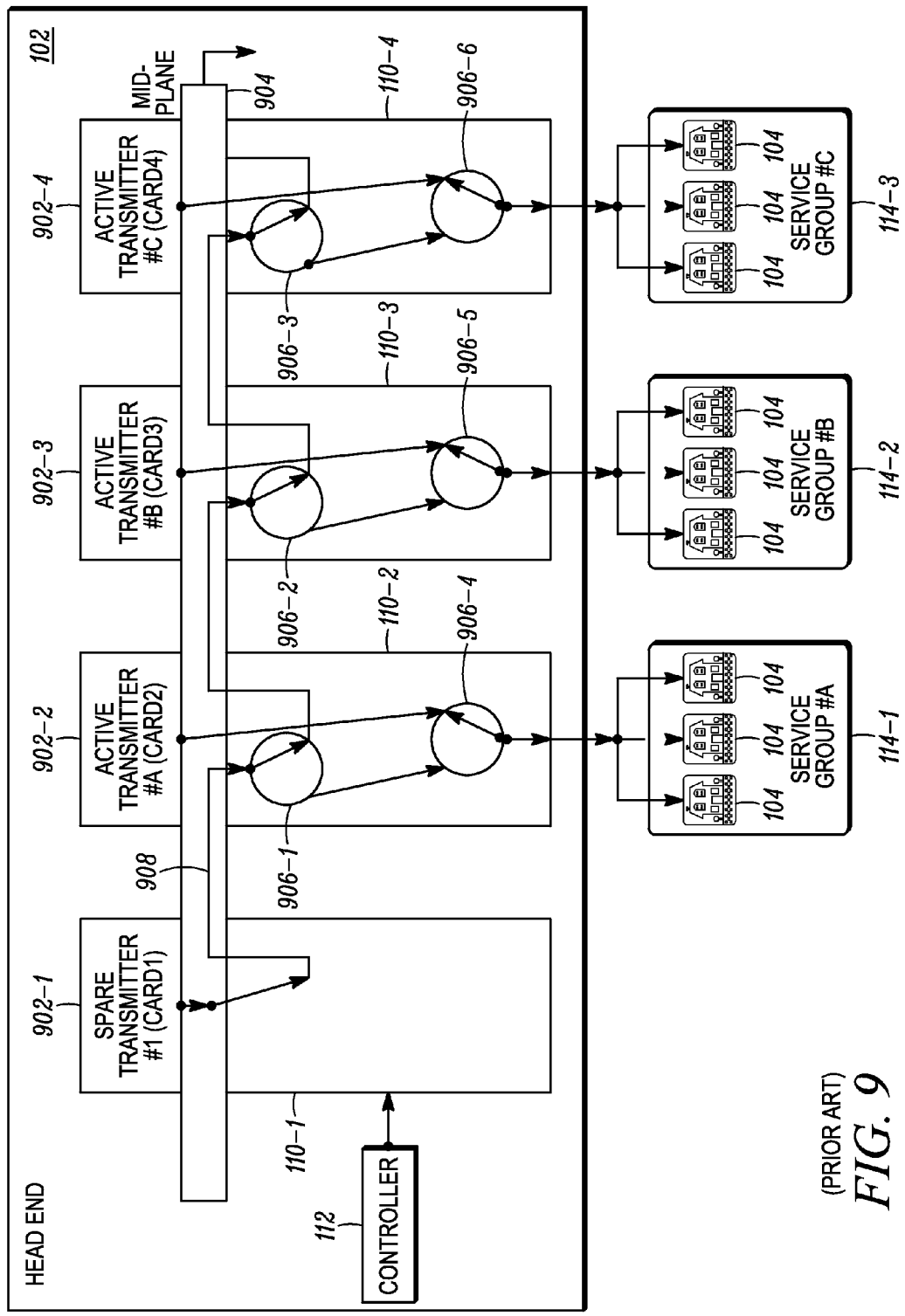
FIG. 9 shows an example of conventional N+1 sparing circuitry.

In traditional N+1 sparing, one spare card is used for N active cards. The following describes typical N+1 sparing without service group consolidation for background purposes. FIG. 9 shows an example of conventional N+1 sparing circuitry. Multiple cards 902-1-902-4 are shown with a spare card 902-1 and three active cards 902-2-902-4 (N=3). Each card may be coupled via a mid-plane 904, such as an RF midplane that connects cards, to switch networks 110-1-110-4. Switch networks 110-2-110-4 may include switches 906-1-906-6.

A spare transmitter #1 (e.g., card1) may be used when one of transmitters #A, #B, or #C fail. In this example, transmitters #A, #B, and #C are all active. Thus, in a path 908, spare transmitter card #1 is coupled through switches 906-1, 906-2, and 906-3 through mid-plane 904, but not to any service groups. The path from transmitter #A to service group #A is through switch 906-4 and not switch 906-1. Further, the path from transmitter #B to service group #B is through switch 906-5 and the path from transmitter #C to service group #C is through switch 906-6.

Figure 10:
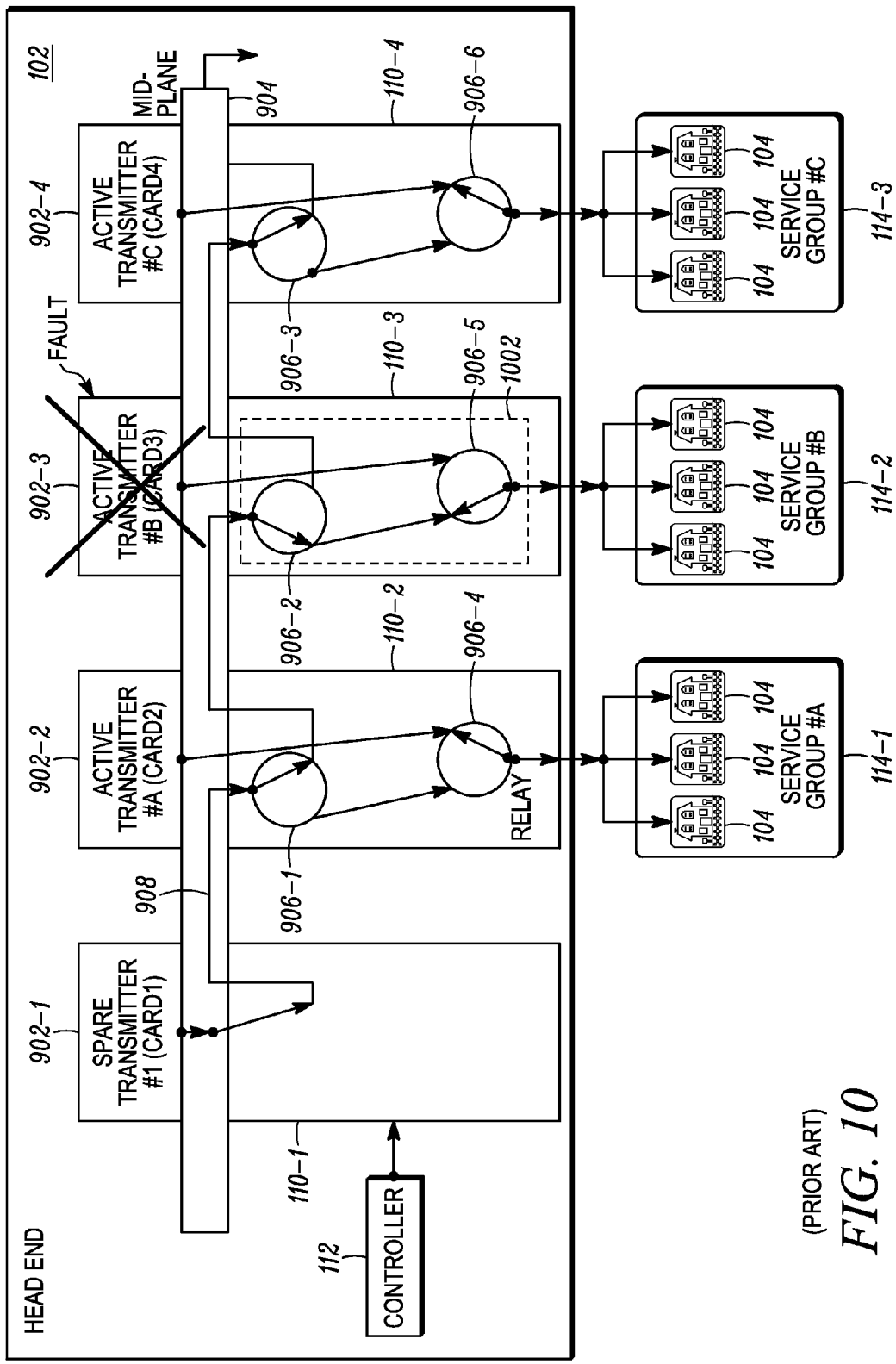
FIG. 10 shows an example of the N+1 sparing circuitry of FIG. 9 when a fault occurs.

FIG. 10 shows an example of the N+1 sparing circuitry of FIG. 9 when a fault occurs. In this case, transmitter #B (card3) at 902-3 has failed. Spare transmitter #1 has taken over transmitting signals to service group #B. For example, in dotted box 1002, at switch 906-2, the switch has been changed to couple switch 906-2 to switch 906-5 from spare transmitter #1. Also, switch 906-5 has been switched from transmitter #B to transmitter #1. Thus, spare transmitter #1 now services service group #B.

Figure 11:
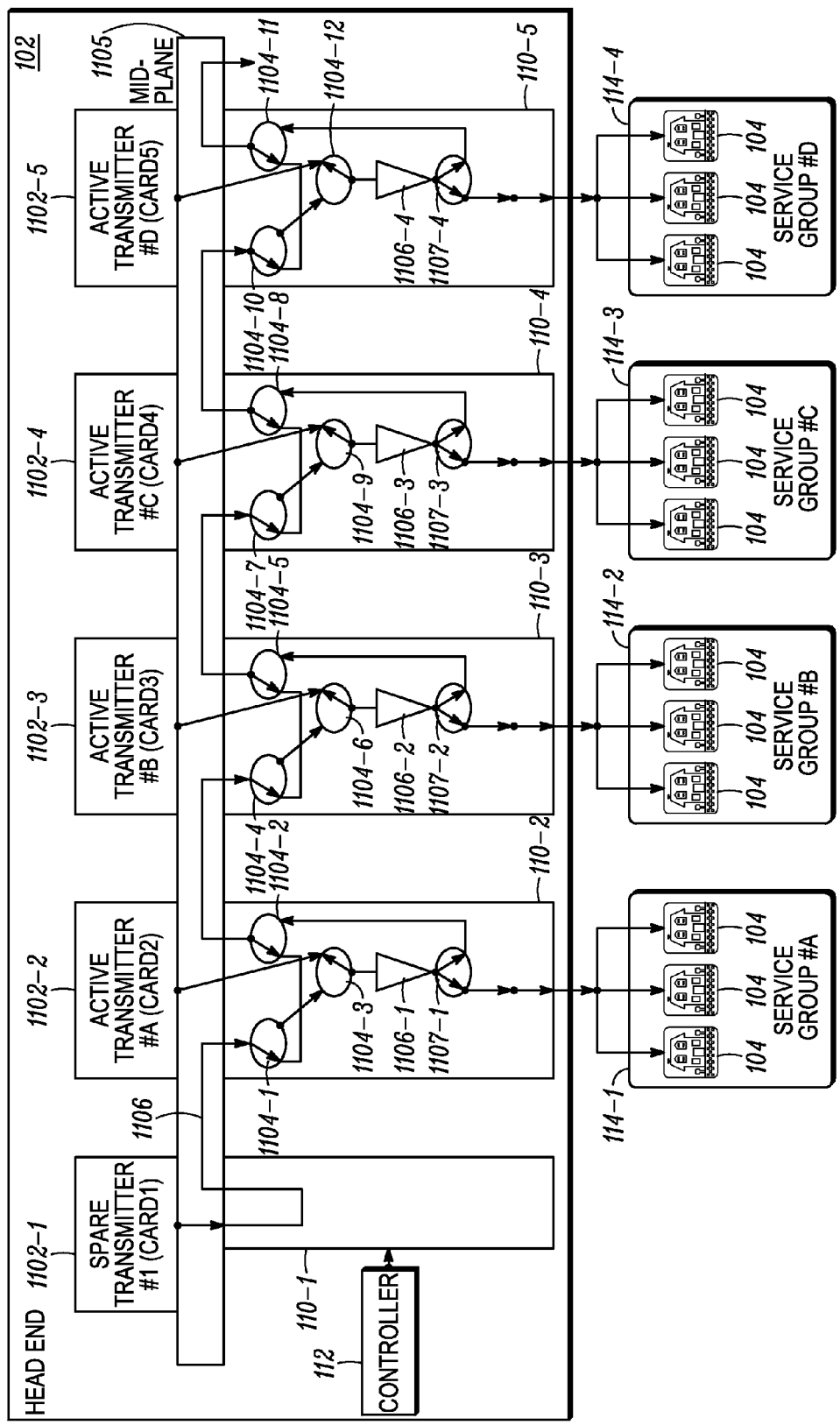
FIG. 11 shows an example of N+1 sparing circuitry combined with service group consolidation circuitry before consolidation using preamplification to keep power levels consistent according to one embodiment.

Now, the circuitry needed to add service group consolidation to the N+1 sparing circuitry will be described. FIG. 11 shows an example of N+1 sparing circuitry combined with service group consolidation circuitry before consolidation using preamplification to keep power levels consistent according to one embodiment. The circuitry includes switches 1104-1-1104-12, amplifiers 1106-1-1106-4, and splitters 1107-1-1107-4. A spare transmitter #1 (e.g., card1) at 1102-1 is the spare card for active transmitter #A 1102-2, transmitter #B 1102-3, transmitter #C 1102-4, and transmitter #D 1102-5. Each transmitter may be in a separate card, card1-card5. When not in use, spare transmitter #1 at 1106 is coupled through switches 1104-1, 1104-2, 1104-5, 1104-6, 1104-9, 1104-10, 1104-13, and 1104-14 through mid-plane 1105, but not to any of the service groups.

For service group #A at 114-1, transmitter #A transmits signals through switch 1104-3, an amplifier 1106-1, and switch 1104-4 to service group #A. Amplifier 1106-1 is used to amplify the signal that may experience power loss through splitter 1107-1. Similar paths are taken for transmitter #B, transmitter #C, and transmitter #D to service groups #B, #C, and #D, respectively.

Figure 12:
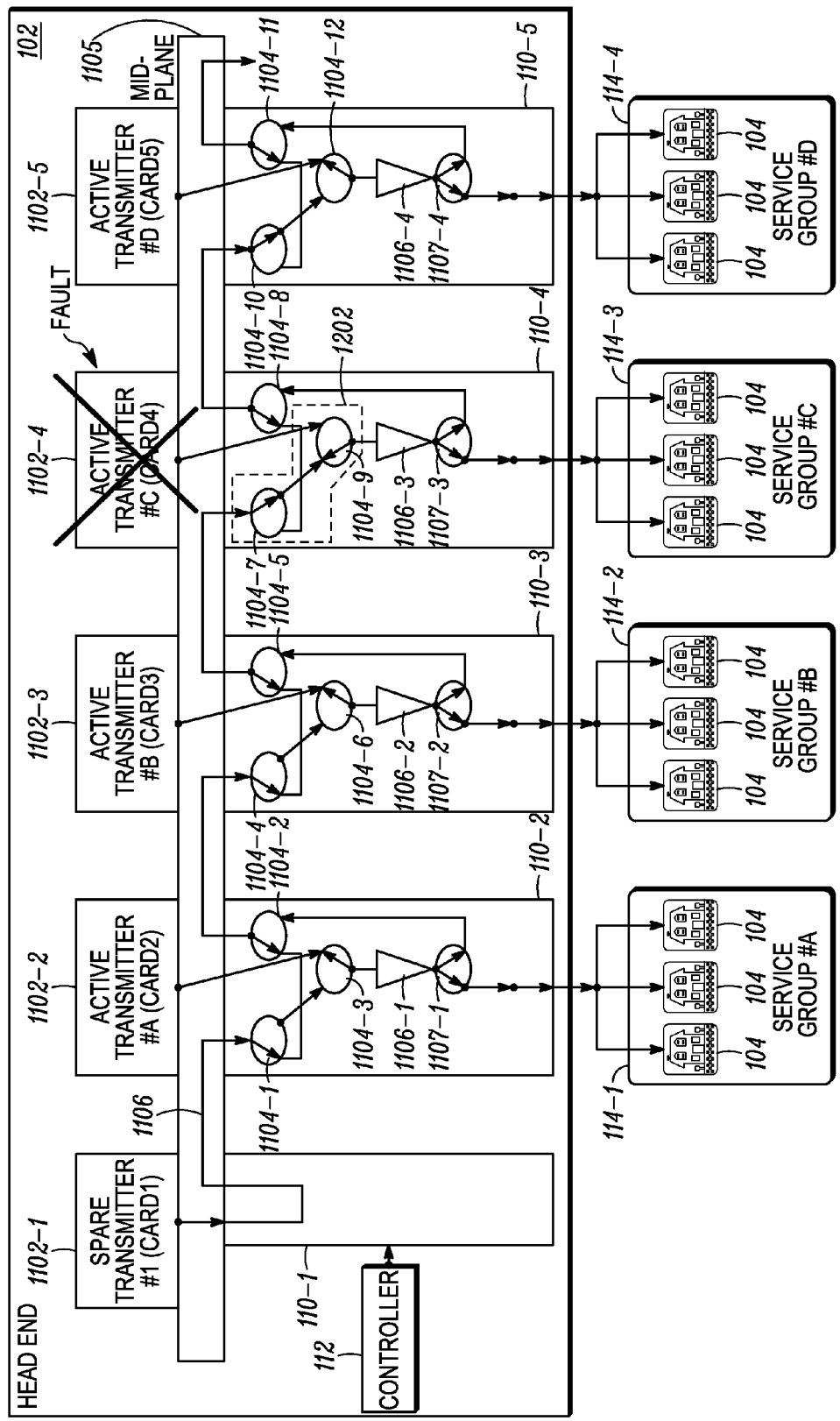
FIG. 12 depicts an example of the use of spare transmitter #1 to replace a transmitter that has failed according to one embodiment.

FIG. 12 depicts an example of the use of spare transmitter #1 to replace a transmitter that has failed according to one embodiment. This may be before service group consolidation has occurred. In this case, transmitter #C at 1102-4 has failed. To take over for transmitter #C, the path at 1106 is changed such that spare transmitter #1 at 1102-1 is coupled to service group #C at 114-3. For example, the path at 1106 goes through switches 1104-1, 1104-2, 1104-5, 1104-6, and 1104-9 to switch 1104-11. In dotted box 1202, this switches the path to switch 1104-7 and switch 1104-9, and couples transmitter #1 to service group #C through amplifier 1106-3 and splitter 1107-3. Amplifier 1106-3 amplifies the signal to make up for the loss introduced by splitter 1107-3.

Figure 13:
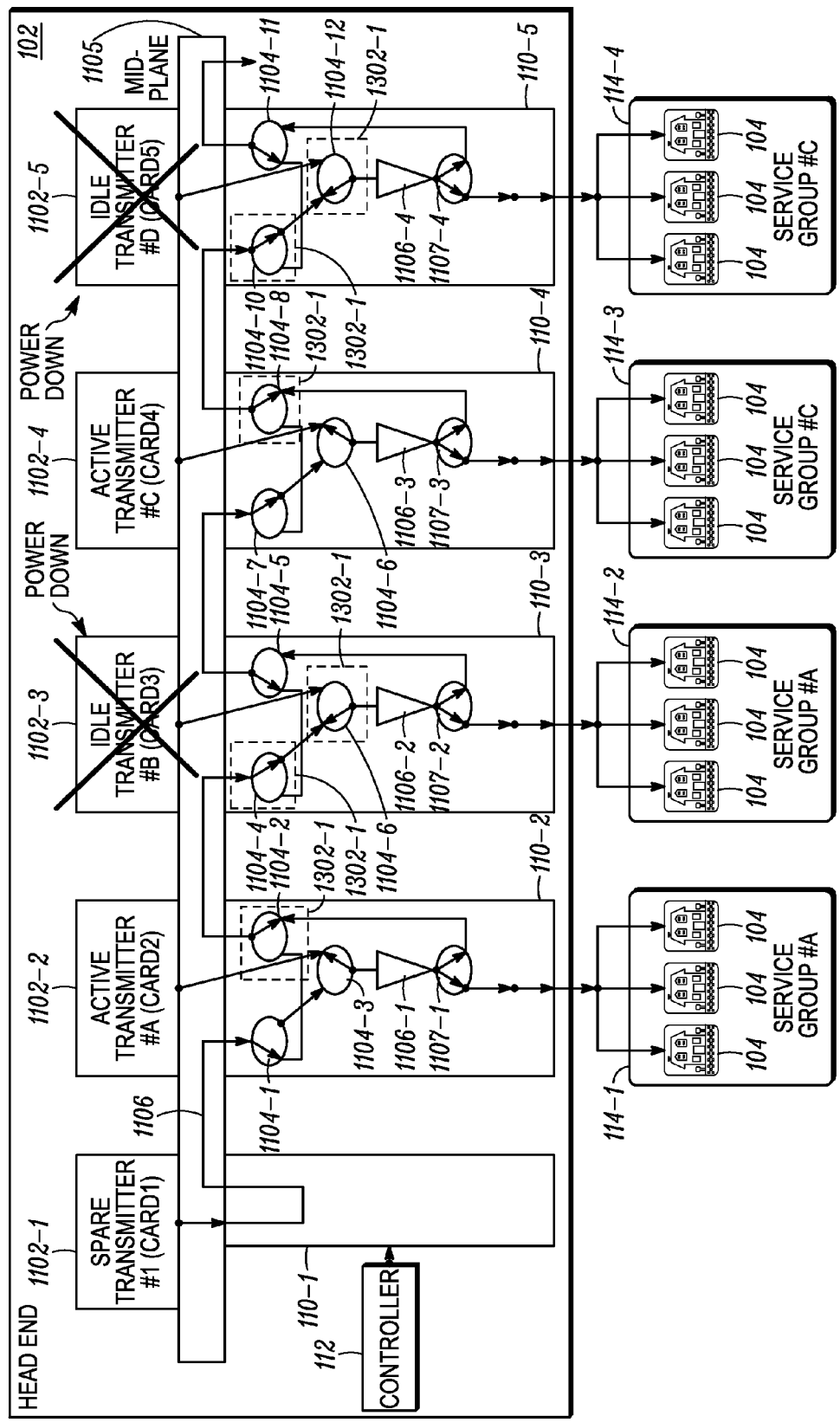
FIG. 13 shows an example of service group consolidation using the N+1 sparing circuitry combined with the service group consolidation circuitry according to one embodiment.

FIG. 13 shows an example of service group consolidation using the N+1 sparing circuitry combined with the service group consolidation circuitry according to one embodiment. In this example, a fault has not occurred. For the consolidation, previous service group #B at 114-2 is consolidated with service group #A and previous service group #D at 114-4 is consolidated into service group #C. In this case, transmitter #B and transmitter #D have been placed in a lower power state. Dotted boxes 1302-1 show the changes to perform the consolidation. For service group #A, switches 1104-2, 1104-4, and 1104-6 are switched such that transmitter #A can transmit to both service groups #A at 114-1 and 114-2. Also, switches 1104-8, 1104-10, and 1104-12 are switched such that transmitter #C can transmit to service group #C at 114-3 and 114-4. For example, the path from transmitter #A to service group #A at 114-1 goes through switch 1104-3, amplifier 1106-1, and splitter 1107-1 to service group #A at 114-1. Also, transmitter #A transmits through switch 1104-3, amplifier 1106-1, splitter 1107-1, and then back to switch 1104-2. From switch 1104-2, the path continues to switch 1104-4 to switch 1104-6, amplifier 1106-2, and splitter 1107-2 to service group #A at 114-2. Similarly, transmitter #C follows a similar path to service group #C at 114-3 and service group #C at 114-4. In this example, the power used may be split in half as compared to before consolidation.

Figure 14:
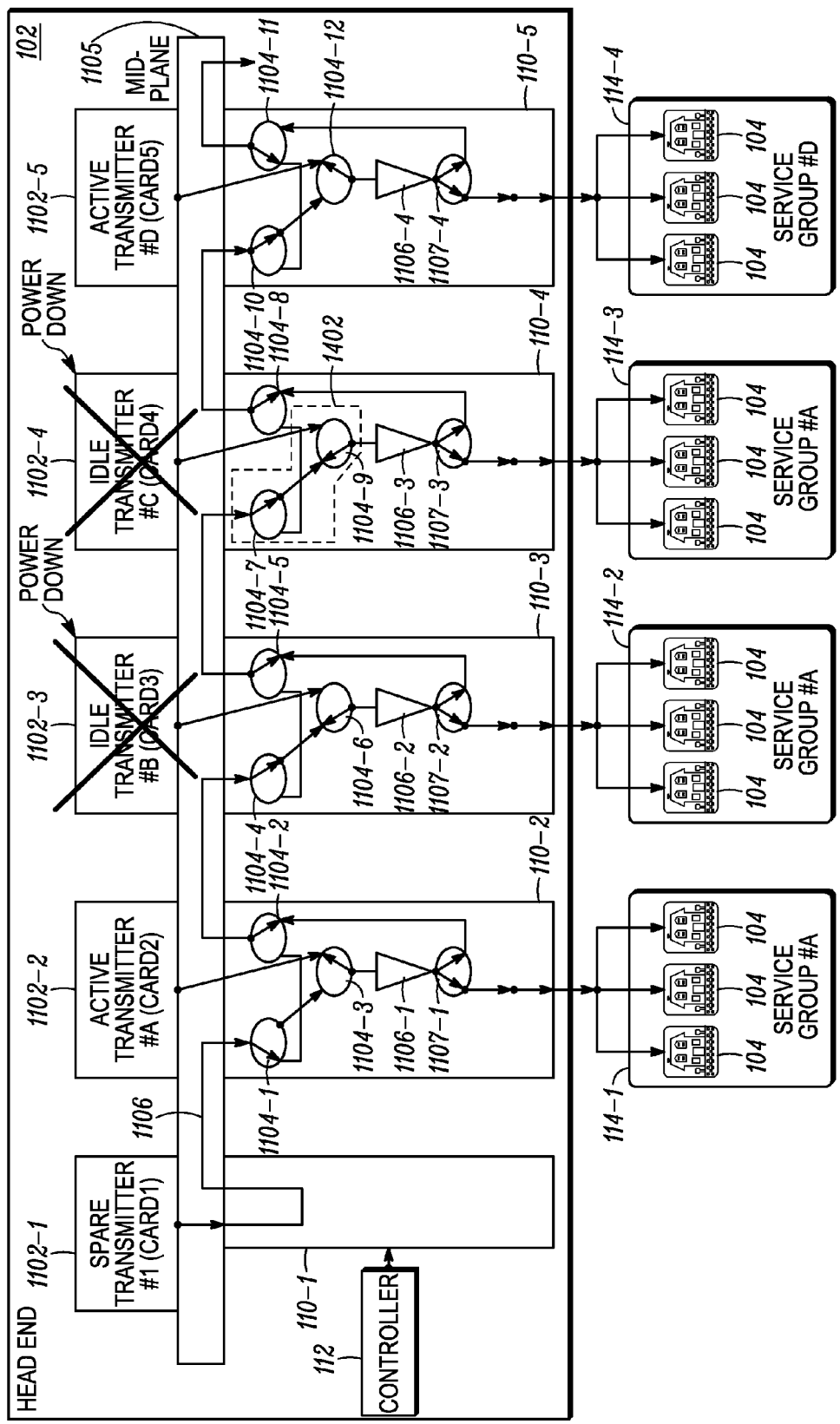
FIG. 14 shows an example of a service group consolidation to include service groups #B and #C with service group #A according to one embodiment.

Different consolidation ratios may also be performed. For example, FIG. 14 shows an example of a service group consolidation to include service groups #B and #C with service group #A according to one embodiment. In this case, transmitters #B and #C have also been placed in a lower power state. Transmitter #A is now servicing previous service group #B and #C, now shown as service group #A at 114-2 and service group #A at 114-3.

The path from transmitter #A to service group #A at 114-1 is the same as described with respect to FIG. 13. The path is also the same from transmitter #A to service group #A at 114-2. For a path from transmitter #A to service group #A at 114-3, the signal may flow from transmitter #A to splitter 1107-2, which then splits the signal to switch 1104-5, switch 1104-7, switch 1104-9, amplifier 1106-3, and splitter 1107-3 to service group #A at 114-3. Dotted box 1402 show the changes made to consolidate the service group at 114-3 with service group #A.

Figure 15:
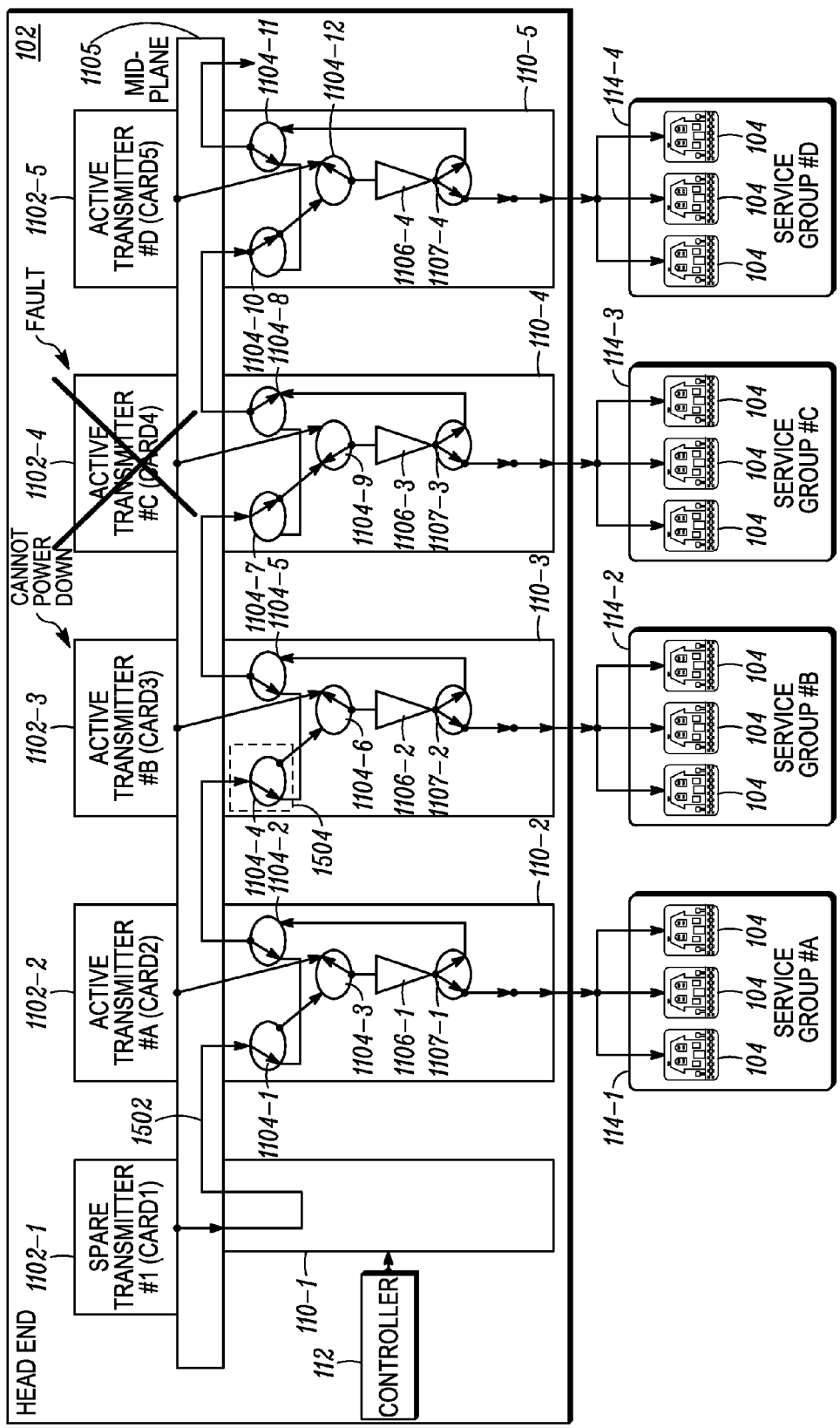
FIG. 15 shows an example where service group consolidation cannot be performed when a fault occurs according to one embodiment.

FIG. 15 shows an example where service group consolidation cannot be performed when a fault occurs according to one embodiment. At dotted box 1504, switch 1104-4 is used for sparing so it cannot be used for service group consolidation. Thus, in this case, service group #B at 114-2 cannot be consolidated into service group #A. Further, service group #C at 114-3 cannot be consolidated into service group #A. In this case, the consolidation must be reversed such that service group #A is serviced by transmitter #A, service group #B is serviced by transmitter #B, and service group #C is now serviced by spare transmitter #1. Transmitter #B needs to be activated in this case. As shown at 1504, switch 1104-4 cannot be used for the consolidation because it is now in the path at 1502 for spare transmitter #1 to service group #C.

Figure 16:
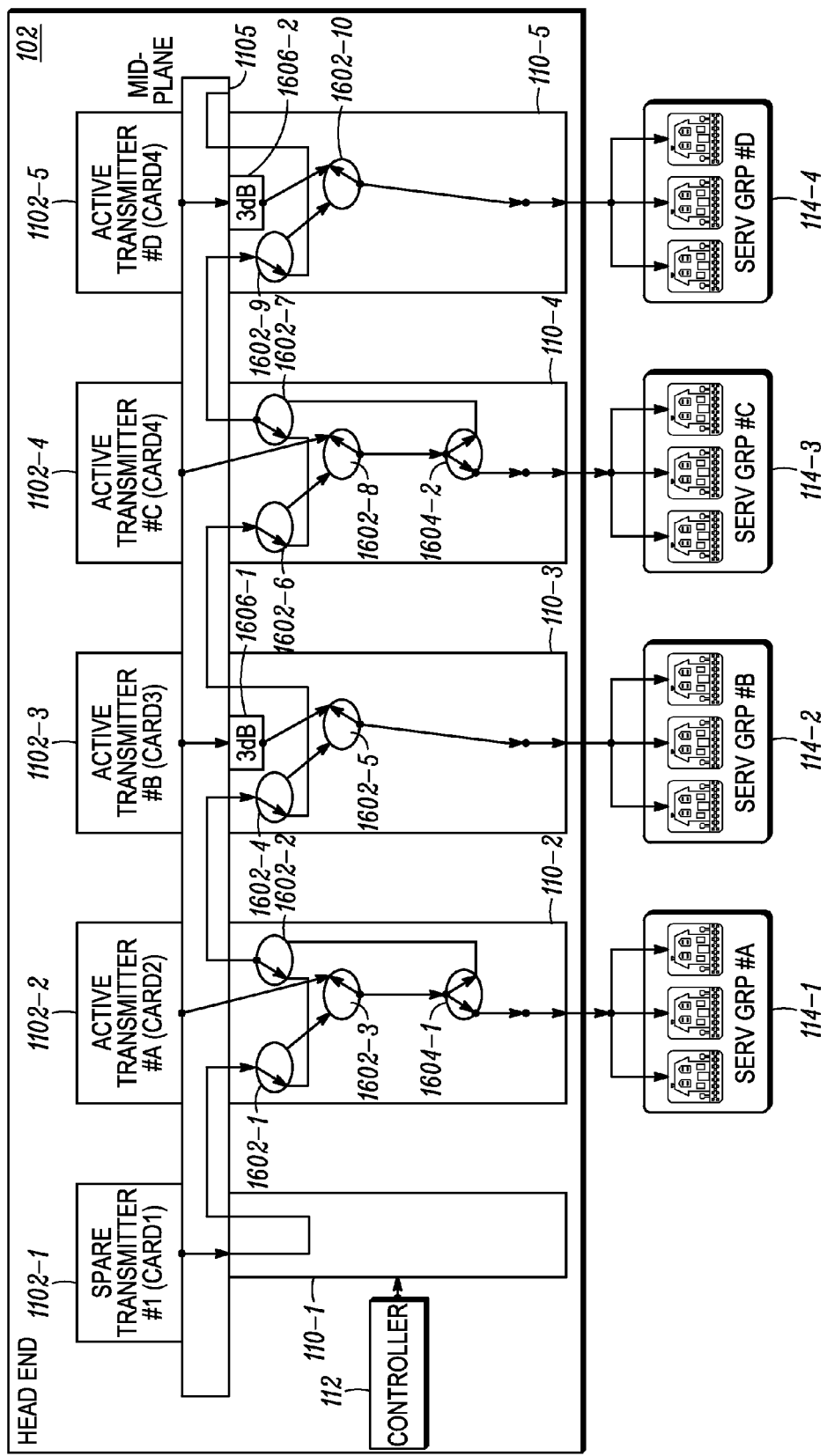
FIG. 16 shows an example of using the attenuator in performing service group consolidation according to one embodiment.

Another example to use the same consolidation with respect to FIGS. 11-14 may use an attenuator instead of an amplifier. FIG. 16 shows an example of using the attenuator in performing service group consolidation according to one embodiment. In this example, the same spare transmitter #1 is provided to substitute for any failed transmitters #A, #B, #C, and #D. In this example, no transmitters have failed and no service group consolidation has been performed. Splitters 1604-1 and 1604-2 in switching network 110-1-110-5 introduce around a 3 dB loss. Attenuators 1606-1 are thus used to reduce the power of signals from transmitters #B and #D, respectively, instead of amplifiers. Transmitters #A-#D transmit to service groups #A-#D through switches 1602-3, 1602-5, 1602-8, and 1602-10, respectfully. A sparing path through switches 1602-1, -2, -4, -6, -7, and -9 is not used.

Figure 17:
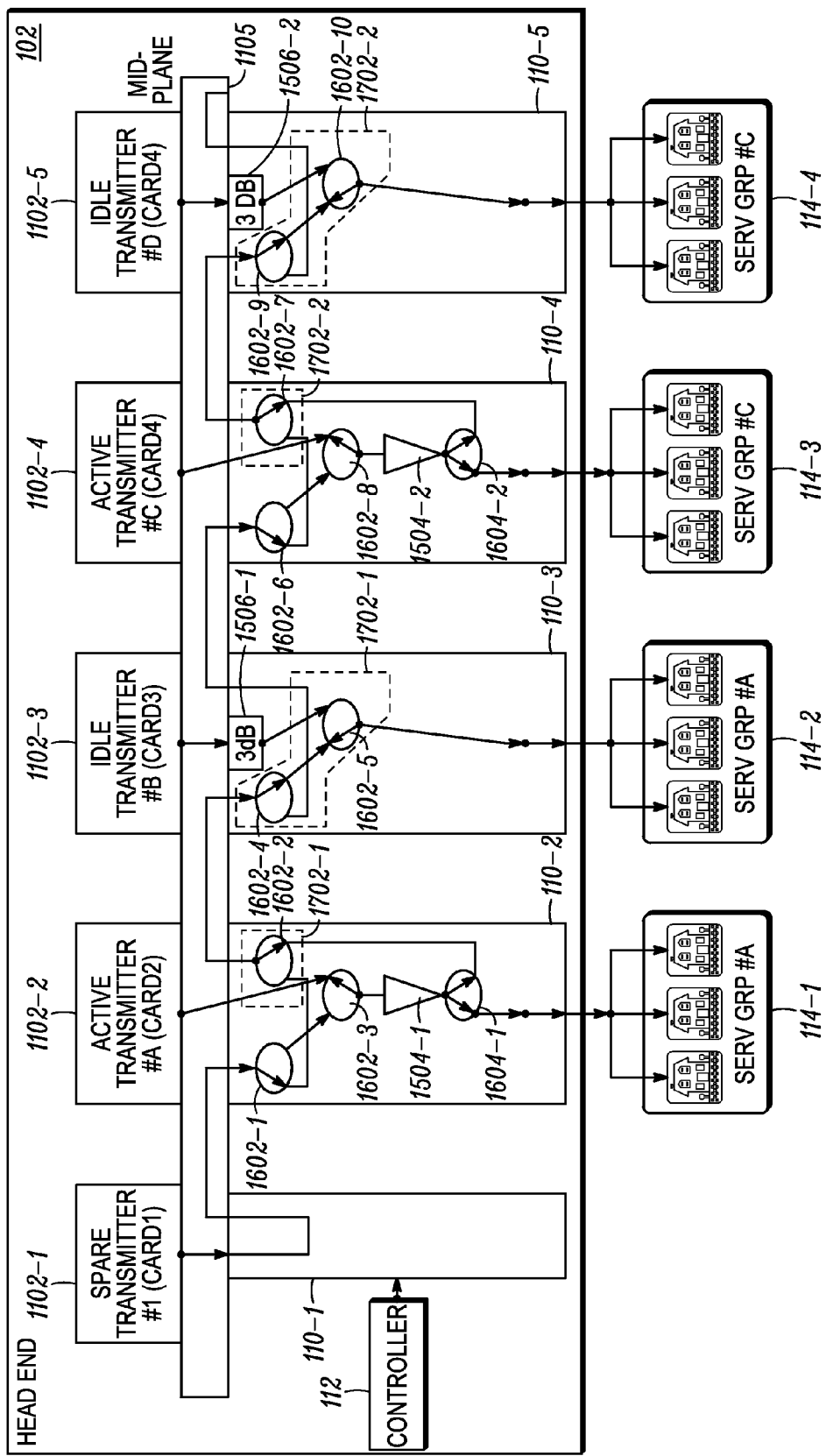
FIG. 17 depicts an example for consolidating previous service group #B into service group #A and previous service group #D into service group #C according to one embodiment.

FIG. 17 depicts an example for consolidating previous service group #B into service group #A at 114-2 and previous service group #D into service group #C at 114-4 according to one embodiment. In changes shown in dotted boxes 1702-1, switches 1602-2, 1602-4, and 1602-5 are switched such that transmitter #A can now transmit signals to service group #A at 114-2. Further, in changes in dotted boxes 1702-2, switches 1602-7, 1602-9, and 1602-10 are switched such that transmitter #C can now transmit to service group #C at 114-4. Additionally, transmitter #A may still transmit to service group #A at 114-1 and transmitter #C may still transmit to service group #C at 114-3. Transmitter #B and transmitter #D are now placed into a lower power state and thus the power used is reduced by half.

Figure 18:
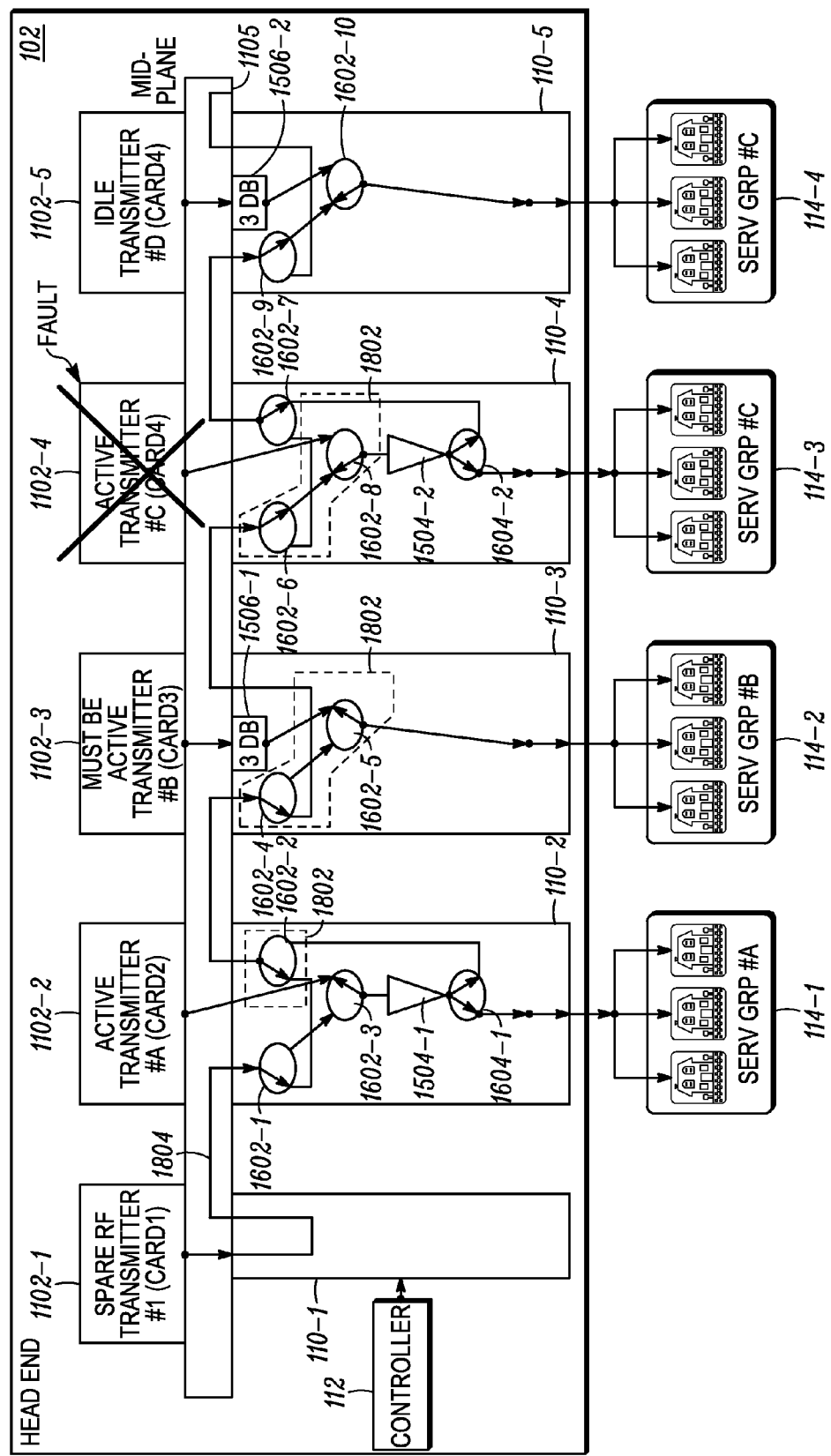
FIG. 18 depicts an example of FIG. 17 after a fault occurs according to one embodiment.

FIG. 18 depicts an example of FIG. 17 after a fault occurs according to one embodiment. In this case, the service group consolidation needs to be reversed due to the fault of transmitter #C. Due to the fault, transmitter #1 needs to be included such that it can transmit to service group #C at 114-3. In this case, in changes shown in dotted boxes 1802, switches 1602-2, 1602-4, 1602-5, 1602-6, and 1602-8 are switched. This is to allow transmitter #1 to transmit to service group C. Also, transmitter #B is powered on and now transmits to service group #B at 114-2, which used to be consolidated with service group #A. Transmitter #B has to be switched on because switch 1602-4 is now being used for sparing. Further, service group #D at 114-4 is still consolidated with service group #C, but receives signals from transmitter #1. That is, transmitter #1 through a path at 1804 transmits through switches 1602-1, 1602-2, 1602-4, and 1602-6 to 1602-8 to splitter 1604-2. Splitter 1604-2 then splits the signal to service group #C at 114-3 and also to service group #C at 114-4 through switches 1602-7, 1602-8, 1602-9, and 1602-10.

Adjacent Card Sparing

Figure 19:
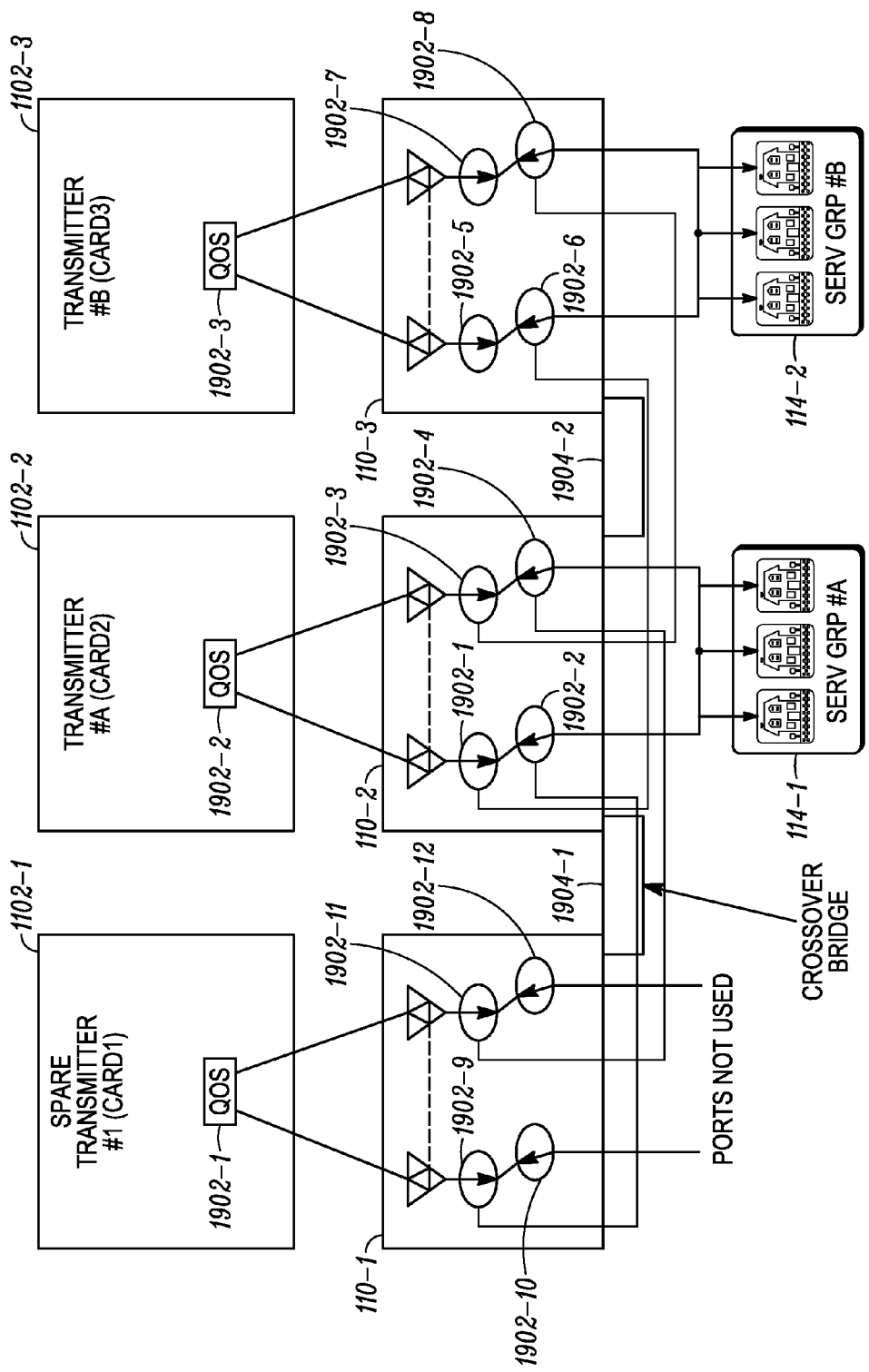
FIG. 19 depicts an example of adjacent card sparing without service group consolidation according to one embodiment.

In this example, each card spares for an adjacent card, such as the card to the right. FIG. 19 depicts an example of conventional adjacent card sparing without service group consolidation according to one embodiment. In this example, spare transmitter #1 (card1) at 1102-1 is the spare card, and transmitter #A (card2) at 1102-2 and transmitter #B (card3) at 1102-3 provide service to service group #A at 114-1 and service group #B at 114-2, respectively. The transmitters shown may be N-channel transmitters, but only two channels are shown.

QOS logic 1902-1-1902-3 may be used to balance the traffic in the N-channels to respective service groups #A and #B. When sparing is not used, transmitter #A transmits to service group #A and transmitter #B transmits to service group #B. For example, in switch network 110-2, transmitter #A may transmit through switches 1902-1 and 1902-2 for a first path and switches 1902-3 and 1902-4 for a second path to service group #A. Also, in switch network 110-3, transmitter #B may transmit through switches 1902-5 and 1902-6 for a first path and switches 1902-7 and 1902-8 for a second path to service group #B. Spare transmitter #1 may include switches 1902-9 and 1902-10 for a first path and 1902-11 and 1902-12 for a second path, but the ports are not used for switch network 110-1. Crossover bridges 1904-1 and 1904-2 are used to couple spare transmitter #1 to switches 110-2 and 110-3. In this case, switches 1902-9 and 1902-11 do not couple spare transmitter #1 to service group #A or service group #B because no faults have occurred.

Figure 20:
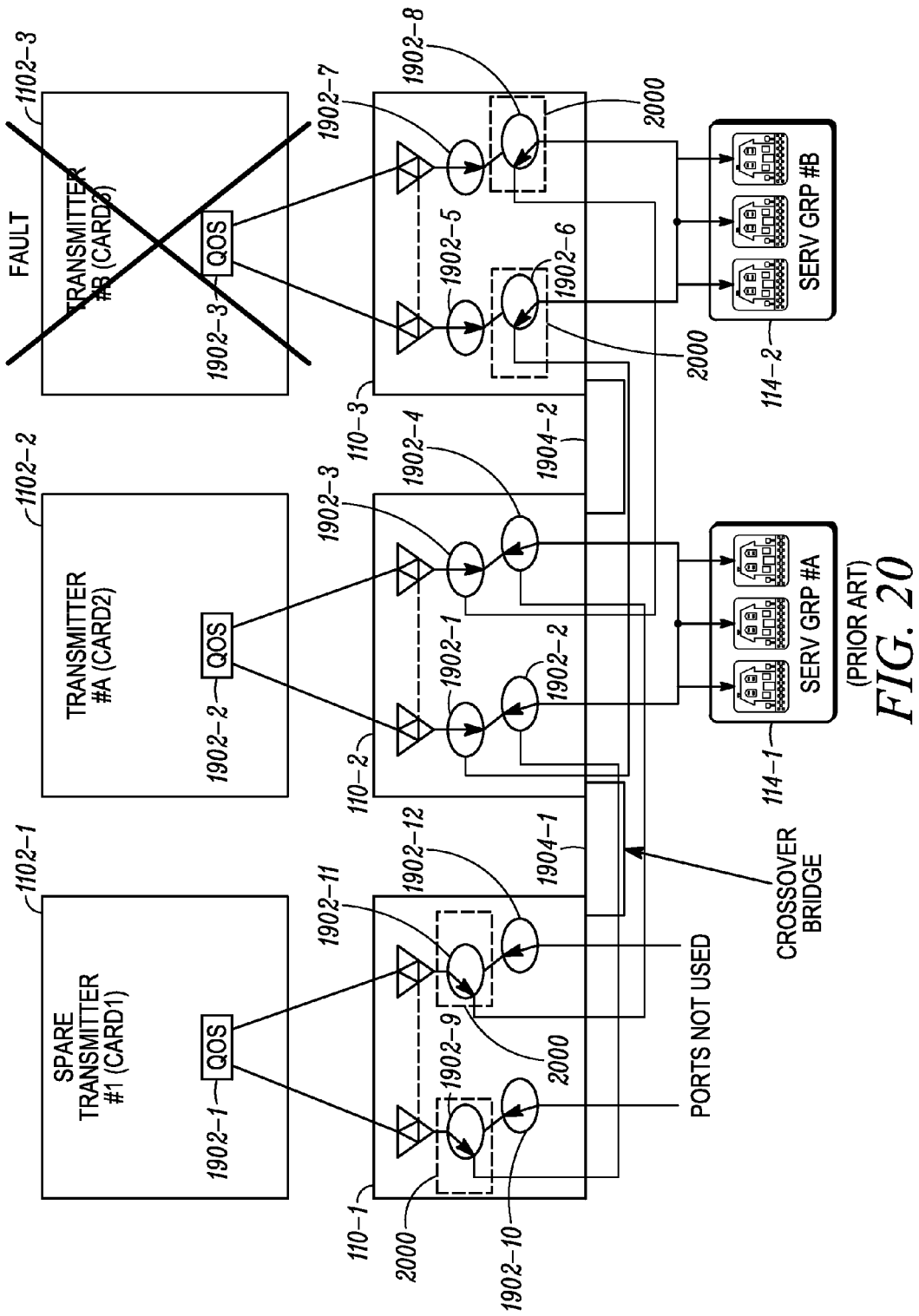
FIG. 20 depicts an example when transmitter #B fails according to one embodiment.

FIG. 20 depicts an example when transmitter #B fails according to one embodiment. In this case, transmitter #B at 1102-3 has failed. Spare transmitter #1 is then coupled to service group #B at 114-2. Dotted boxes 2000 are shown in FIG. 20 to show the switches that change. For example, switch 1902-9 is switched to couple a first path for spare transmitter #1 to switch 1902-6. Also, switch 1902-11 is switched to couple spare transmitter #1 to switch 1902-8. This couples spare transmitter #1 to service group #B.

Adjacent Sparing with Service Group Consolidation

Figure 21:
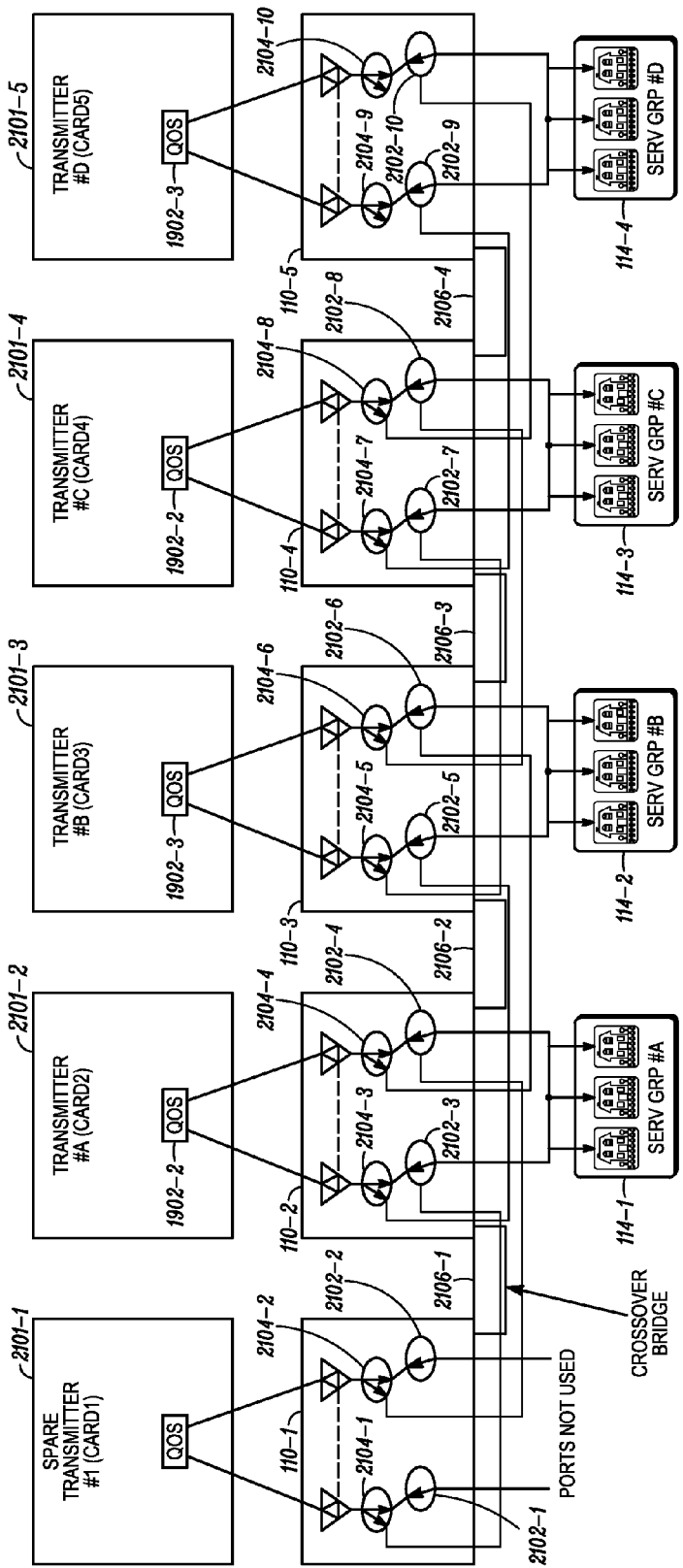
FIG. 21 depicts an example of adjacent sparing circuitry that is combined with circuitry for service group consolidation according to one embodiment.

FIG. 21 depicts an example of adjacent sparing circuitry that is combined with circuitry for service group consolidation according to one embodiment. In this case, splitters 2104 are included to allow for the service group consolidation. Transmitters #A-#D at 2101-2-2101-5 transmit to respective service groups #A-#D through respective switch networks 110-2-110-5. When in normal operation, transmitter #A transmits through splitter 2104-3 and switch 2102-3 to service group #A in a first path and through splitter 2104-4 and switch 2102-4 in a second path to service group #A. The same is true for transmitters #B, #C, and #D. Spare transmitter #1 at 2101-1 is not coupled to any of service groups #A-#D through crossover bridges 2106-1-2106-4.

Figure 22:
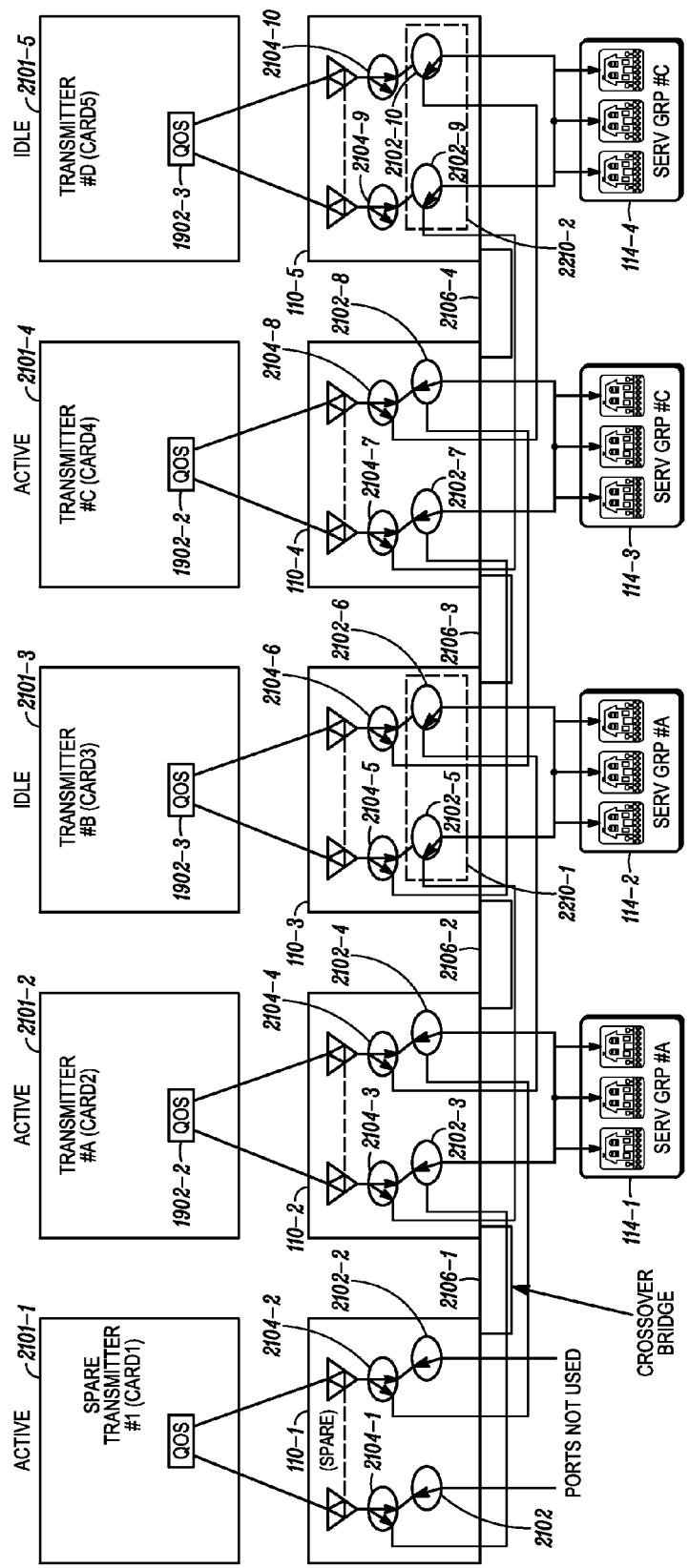
FIG. 22 depicts an example of service group consolidation according to one embodiment.

FIG. 22 depicts an example of service group consolidation according to one embodiment. Transmitter 2101 may be a passive optical network (PON) Physical Interface Card (PPIC) and switch network 110 is part of a PON Fiber Module), but other architectures may be used. In this case, previous service group #B at 114-2 has been consolidated with service group #A and previous service group #D has been consolidated with service group #C at 114-4. In this case, controller 112 has placed transmitters #B and #D and they are now idle. Spare transmitter #1 is active to still allow for sparing to occur upon failure.

A dotted box at 2210-1 is provided to show the changes to couple transmitter #A to service group #A at 114-2, switch 2102-5 is switched to couple transmitter #A to service group #A at 114-2. In this case, the path is from transmitter #A through splitter 2104-3 to switch 2102-5 to service group #A. Further, the second path from transmitter #A is through splitter 2104-4 to switch 2102-6.

For service group #C at 114-4, transmitter #C is similarly configured to transmit to service group #C at 114-4. In this case, switches 2102-9 and 2102-10 are switched to be coupled to splitters 2104-7 and 2104-8 of switch network 110-4. The changes are shown in dotted box 2210-2.

Figure 23:
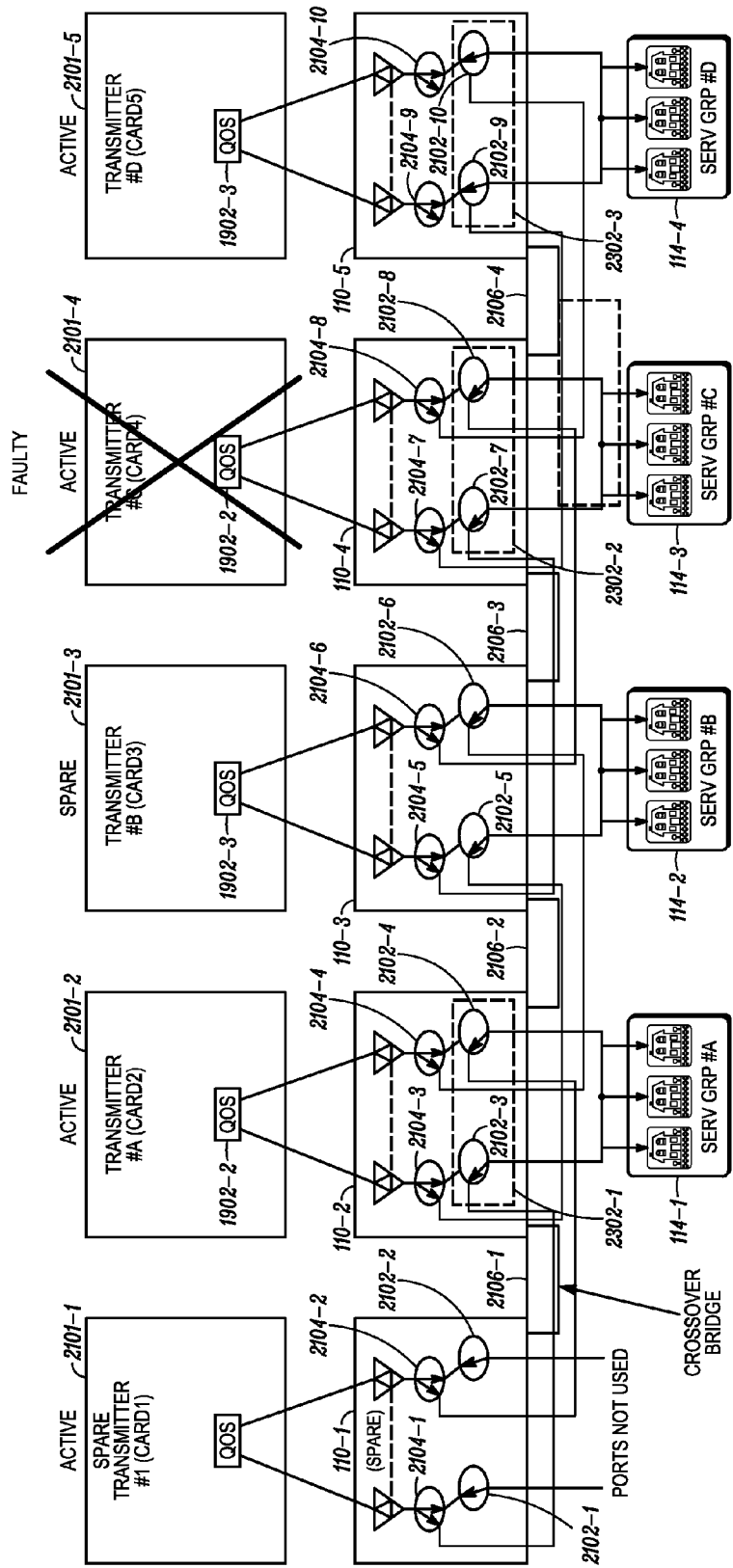
FIG. 23 depicts an example of FIG. 22 after service group consolidation is unwound and a spare is active according to one embodiment.

When one of the transmitters fails, then the service group consolidation should be unwound. FIG. 23 depicts an example of FIG. 22 after service group consolidation is unwound and a spare is active according to one embodiment. In this case, transmitter #C has failed. In this case, transmitter #B must be the spare due to being the adjacent transmitter. Transmitter #B is activated and coupled to service group #C at 114-3 by switching switches 2102-7 and 2102-8 as shown in dotted box 2302-2. Transmitter #A is already coupled to service group #B due to the service group consolidation. Those connections can remain the same. Also, the connection from transmitter #C to service group #D at 114-4 is disconnected as shown by the dotted box 2302-3.

The adjacent sparing continues with the spare card and transmitter #A. Spare transmitter #1 is now coupled to service group #A through splitters 2104-1 and 2104-2 to switches 2102-3 and 2102-4 as shown in dotted box 2302-1. In this case, the path from transmitter #A to service group #A at 114-1 has been disconnected. Accordingly, the adjacent sparing scheme has been implemented for service groups #A, #B, and #C. Service group #D is now serviced by transmitter #D.

N+0 Sparing with Service Group Consolidation

Figure 24:
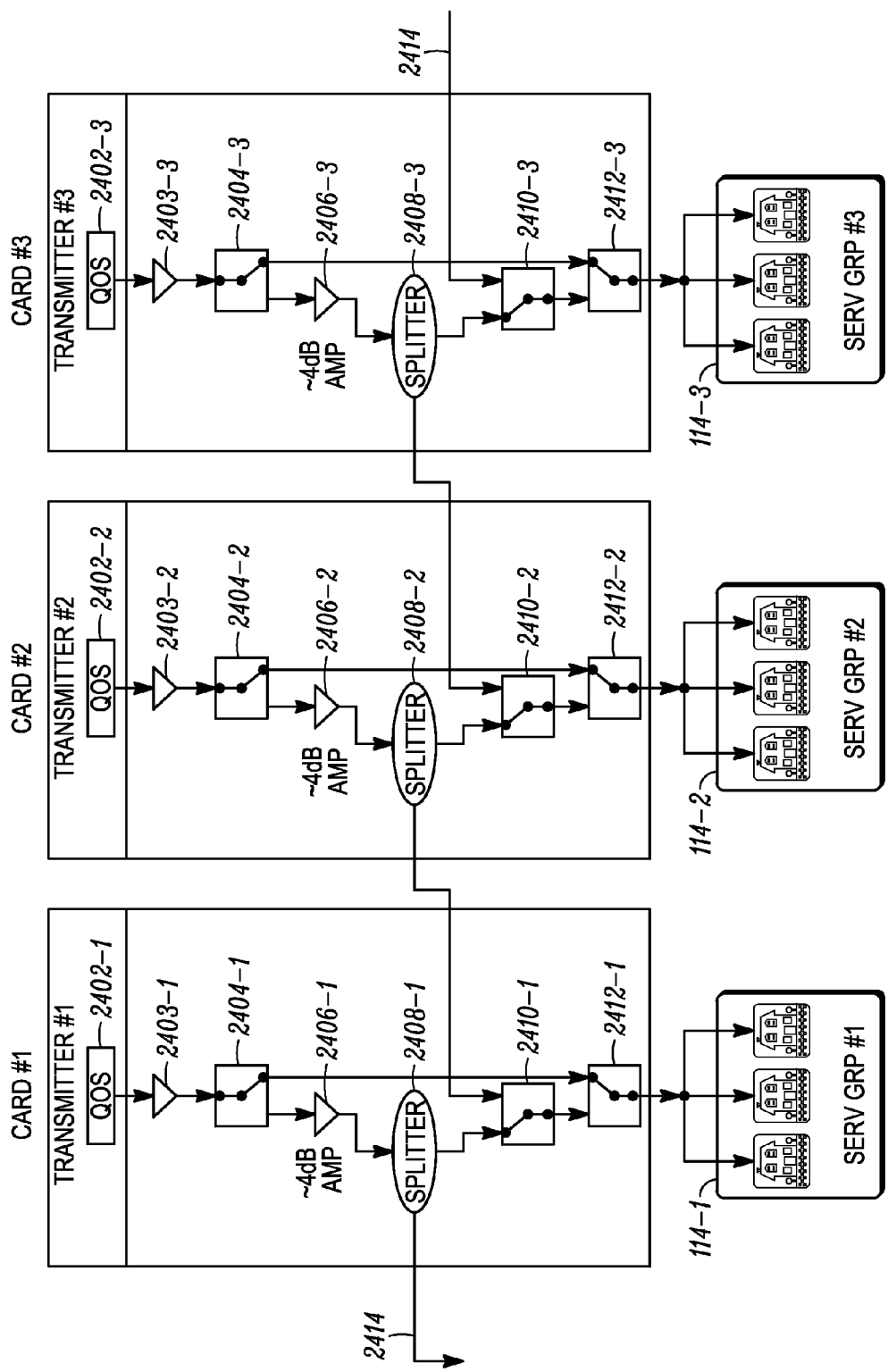
FIG. 24 depicts an example of N+0 sparing circuitry in normal operation according to one embodiment.

In N+0, no spare card exists. When a fault occurs, subscribers associated with a faulty card are provided service by a neighboring card. FIG. 24 depicts an example of N+0 sparing circuitry in normal operation according to one embodiment. In this case, circuitry allows for one card to pick up a service group from a second card. In FIG. 24, card #1, card #2, and card #3 are shown including transmitter #1, transmitter #2, and transmitter #3, respectively. QOS logic 2402-1-2402-3 for each respective transmitter sends signals to a single service group. For example, when in normal operation, transmitter #1 sends signals to service group #1 through an amplifier 2403-1, a switch 2404-1, and a switch 2410-2. An amplifier 2406-1, a splitter 2408-1, a switch 2412-1 are added to provide service group consolidation and will be described with respect to FIG. 25. Amplifiers 2403 and 2406 may provide around a 4 dB amplification to keep power levels consistent. A similar path is taken for transmitter #2 to service group #2 and from transmitter #3 to service group #3.

A path for sparing is provided through splitters 2408. In this example, transmitter #1 may be a spare card for transmitter #3 as a path shown at 2414 to switch 2410-3. For example, a path from splitter 2408-1 shown at 2414 to switch 2410-3 can be used when card #3 fails. Similarly, card #3 may be coupled to card #2 through splitter 2408-3 to switch 2410-2 and card2 is similarly coupled to card1.

Figure 25:
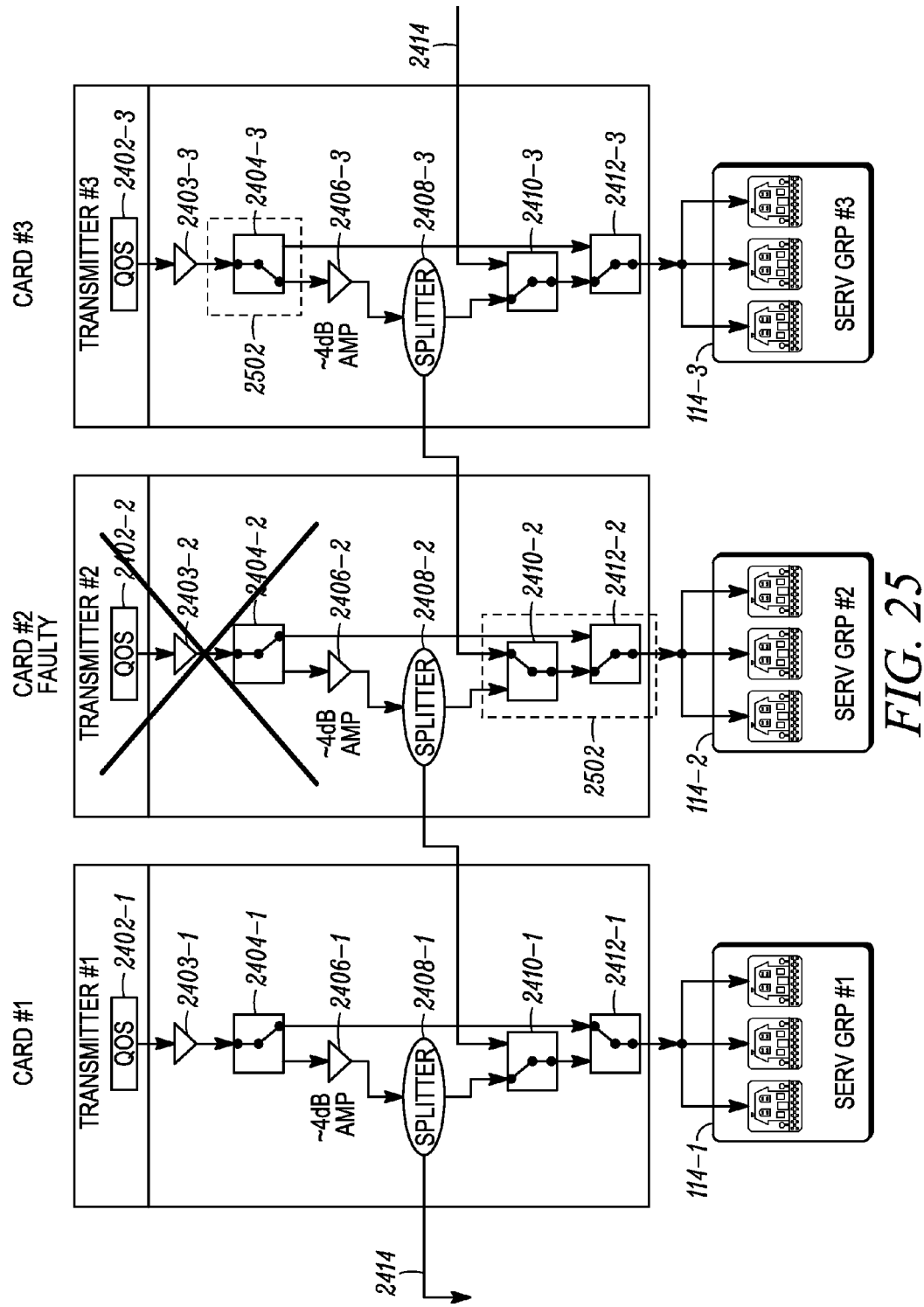
FIG. 25 depicts an example when transmitter #2 fails according to one embodiment.

FIG. 25 depicts an example when transmitter #2 fails according to one embodiment. In this case, card3 is used as the spare card to service service groups #2 and #3. For example, transmitter #3 is coupled to service group #2 through amplifier 2402-3, switch 2404-3, amplifier 2406-3, splitter 2408-3, and switch 2410-2. The changes are shown in dotted box 2502 where switch 2404-3 is switched to be coupled to splitter 2408-3 and switch 2410-2 is switched to be coupled to splitter 2408-3. Also, switch 2412-2 is switched from transmitter #2 to be coupled to switch 2410-2.

Figure 26:
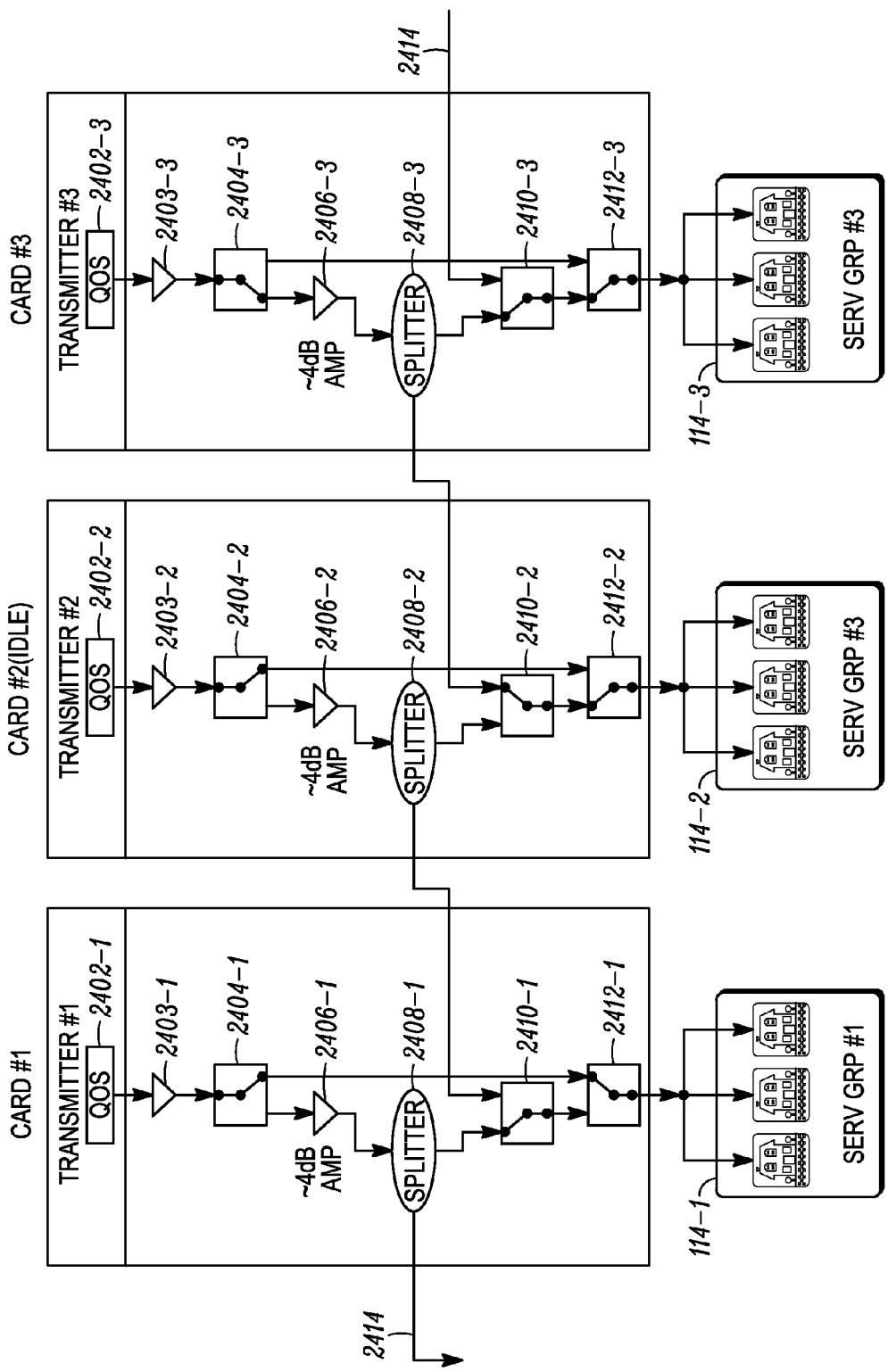
FIG. 26 shows the use of N+0 sparing circuitry that can be used to consolidate service groups according to one embodiment.

FIG. 26 shows the use of N+0 sparing circuitry that can be used to consolidate service groups according to one embodiment. In this case, transmitter #2 has been placed in a lower power state. Previous service group #2 at 114-2 is now service group #3. Transmitter #3 is coupled to service group #3 at 114-2 through the same path as described above with respect to FIG. 25.

Separation of Service Groups

When controller 112 decides that service group consolidation is no longer appropriate (based on time, increased traffic usage, etc.), it can reverse the service group consolidation process by first returning any network components in a lower power state to a normal active (higher) power state, and then re-switching some or all communication paths back to the original positions, thereby returning the service groups to their normal state. As an example, re-consolidation would typically be done at the end of the midnight-to-8 AM time window, when traffic on the Internet begins to rise again. The actions required for re-consolidation are essentially the reverse of the actions taken by consolidation. This essentially returns the service groups to their original (smaller) size so that each service group subscriber has more average bandwidth capacity available to be used by it.

Method Flow

Figure 27:
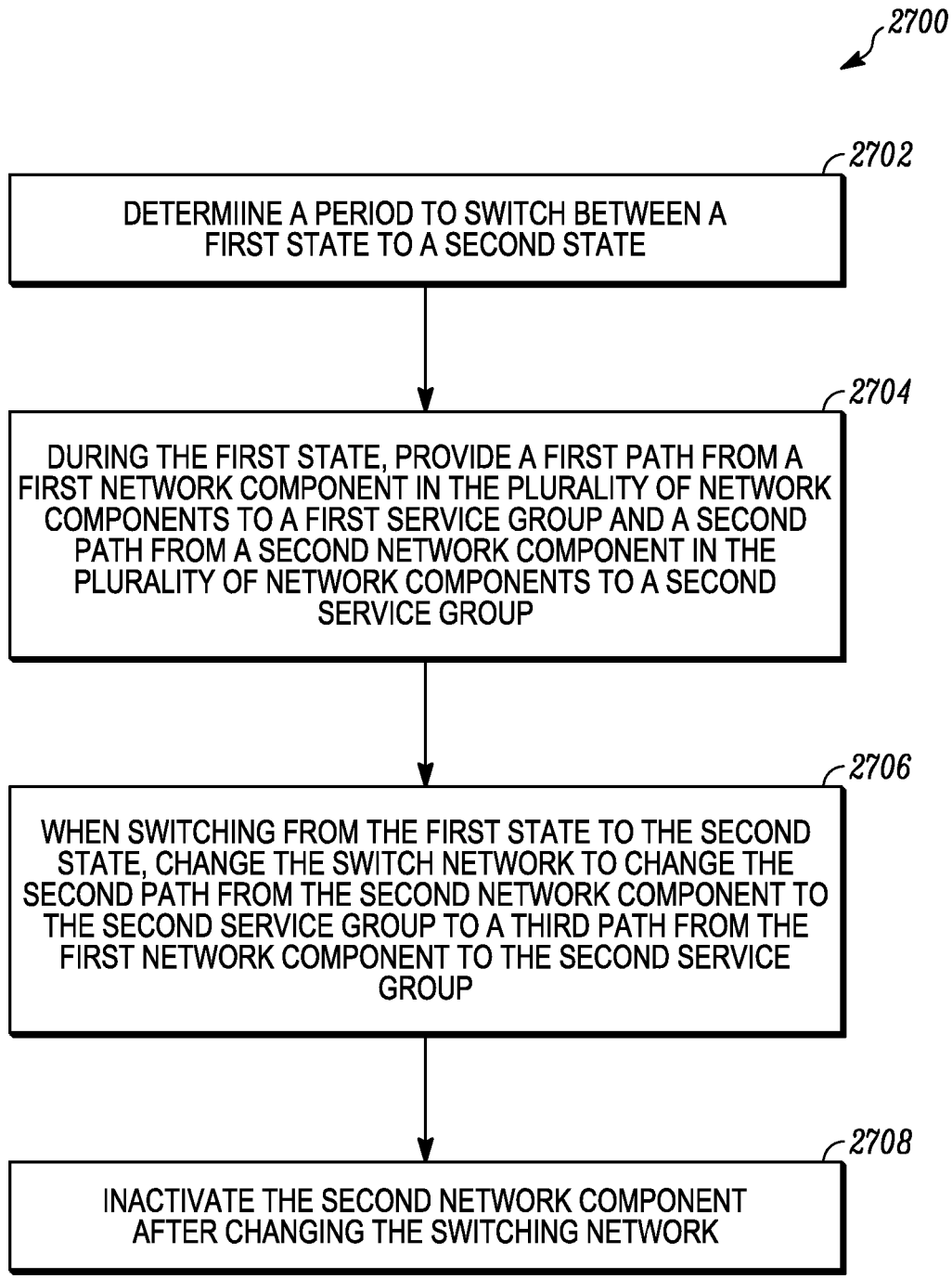
FIG. 27 depicts a simplified flowchart of a method for managing power in distribution network that includes a plurality of network components coupled to a plurality of service groups of subscribers according to one embodiment.

FIG. 27 depicts a simplified flowchart 2700 of a method for managing power in distribution network 100 that includes a plurality of network components coupled to a plurality of service groups of subscribers according to one embodiment. At 2702, controller 112 determines a period to switch between a first state to a second state. The second state is where at least one service group is consolidated with another service group and the first state is where the at least one service group is not consolidated with another service group.

At 2704, during the first state, switch network 110 provides a first path from a first network component in the plurality of network components to a first service group and a second path from a second network component in the plurality of network components to a second service group. Then, at 2706, when switching from the first state to the second state, controller 112 changes a switch network 110 to change the second path from the second network component to the second service group to a third path from the first network component to the second service group. Now, the first network component services the first service group and the second service group. At 2708, controller 112 powers down the second network component after changing the switching network into a lower power state, which is a state that uses less power than an active state.

EXAMPLE

The following provides an example calculation to demonstrate the power savings. The term "initial service group" is used to specify the service groups before any service group sizes are changed (due to triggers) and the term "final service group" is used to specify the larger service groups that are created after service group sizes are increased (due to triggers). The following may be assumed in this example:

Assume that an MSO has low bandwidth utilizations on their initial service groups for some fraction ($f_{low}$) of each day.

Assume that the active RF and digital circuitry associated with transmitting and receiving RF signals into each initial service group is given by $P_{actv}$.

Assume that this power level is reduced to $P_{idle}$ whenever the RF and digital circuitry associated with transmitting and receiving RF signals into each initial service group is idled.

Assume $P_{actv} \gg P_{idle}$.

Assume that an average of $N_{init}$ subscribers connect to the RF signals contained within each initial service group (prior to any triggers being fired to change the service group size).

Assume that an average bandwidth capacity of B is provided into the initial service group that it is connected to a particular set of RF and digital circuitry.

Assume that the average bandwidth per subscriber offered into each initial service group (prior to any triggers being fired to change the service group size) is given by $B/N_{init}$.

Assume that after a trigger is fired to change the service group sizes, a total of X of the service groups are combined together to create a new, larger service group. Only one of the X sets of RF and digital circuitry is left active, and X−1 sets of RF and digital circuitry are idled after this change. The value of X includes the initial service group (group of subscribers) that were originally connected to the RF and digital circuitry that is still active. The value of X also includes the X−1 initial service groups (groups of subscribers) that are now connected to idle sets of RF and digital circuitry.

Before the trigger was fired, the following shows the power and bandwidth:

The total power consumed by the X initial service groups was given by $X*P_{actv}$.

The total bandwidth capacity injected into the group of X initial service groups was given by X*B.

The total number of subscribers included in the group of X initial service groups was given by $X*N_{sub}$.

The average bandwidth capacity per subscribers in the group of X initial service groups was given by $B/N_{sub}$.

After the trigger was fired, and the X initial service groups are combined into a single, larger service groups serviced by a single set of RF and digital circuitry, the following is found for the power and bandwidth:

The total power consumed by the X initial service groups is given by $1P*_{actv}+(X-1)*P_{idle}$.

The total bandwidth capacity injected into the group of X initial service groups is given by B.

The total number of subscribers included in the group of X initial service groups is given by $X*N_{sub}$.

The average bandwidth capacity per subscribers in the group of X initial service groups was given by $B/(X*N_{sub})$.

If assuming T is the total time in a day (24 hours=86,400 sec), if service group consolidation is not used, then the total energy consumed by the X initial service groups in a typical day is given by:

$$E_{no\ consolidation}=(X)*(P_{actv})*(T)$$

If service group consolidation is used and if the trigger creates the larger final service group for a fraction of time during each day given by $f_{low}$ (where $f_{low}$ is the fraction of time when bandwidth utilization levels are deemed to be low enough to permit triggers to be fired), then the total energy consumed by the X initial Service Groups in a typical day is given by:

$$E_{consolidation}=(X)*(P_{actv})*(1-f_{low})*(T)+(1)*(P_{actv})*(f_{low})*(T)+(X-1)*(P_{idle})*(f_{low})*(T)$$

Thus, the average energy consumption consumed in a typical day is lowered by the application of service group consolidation. The fractional change in average energy consumption produced by the service group consolidation is given by:

$$(E_{consolidation})/(E_{no\ consolidation})=[(X)*(P_{actv})*(1-f_{low})*(T)+(1)*(P_{actv})*(f_{low})*(T)+(X-1)*(P_{idle})*(f_{low})*(T)]/[(X)*(P_{actv})*(T)]$$

As an example, assume X=2, $P_{actv}$=400 W, $P_{idle}$=0, $f_{low}$=0.33, T=86400 sec . . . then:

$$(E_{consolidation})/(E_{no\ cosolidation}) =$$
$$[(X)*(P_{actv})*(1-f_{low})*(T)+(1)*(P_{actv})*(f_{low})*(T)+$$
$$(X-1)*(P_{idle})*(f_{low})*(T)]/[(X)*(P_{actv})*(T)] =$$
$$[(2)*(400)*(0.67)*(86400)+(1)*(400)*(0.33)*(86400)+$$
$$(1)*(0)*(0.33)*(86400)]/[(2)*(400)*(86400)] =$$
$$[46.3\ Mjoules + 11.4\ Mjoules + 0\ Mjoules]/$$
$$[69.1\ Mjoules] = [57.7\ Mjoules]/[69.1\ Mjoules] = 0.835$$

Thus, 83.5% of the energy is used after the service group consolidation, meaning there is an energy savings of 16.5%.

Larger energy savings are possible by increasing the value of X or increasing the $f_{low}$ fraction.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for managing power in a distribution network that includes a plurality of network components coupled to a plurality of service groups of subscribers, the method comprising:
    selecting a period to switch from a first state to a second state, wherein the second state is where at least one service group is consolidated with another service group in the plurality of service groups and the first state is where the at least one service group is not consolidated with the another service group;
    during the first state, controlling a switching network to provide a first path from a first network component in the plurality of network components to a first service group and a second path from a second network component in the plurality of network components to a second service group; and
    when switching from the first state to the second state, performing:
        changing the switching network to change the second path from the second network component to the second service group to a third path from the first network component to the second service group, wherein the first network component services the first service group and the second service group; and
        placing the second network component into a lower power state after changing the switching network.

2. The method of claim 1, wherein the network component comprises a transmitter configured to transmit content or a receiver to receive content.

3. The method of claim 1, wherein:
    subscribers in the first service group and the second service group experience less average bandwidth per subscriber during the second state as compared to the first state, and
    less power is used due to the placing of the second network component into the lower power state during the second state as compared to the first state.

4. The method of claim 1, wherein:
    the second path is from the second transmitter through a switch to the second service group, and
    the third path is from the first transmitter through the switch to the second service group, wherein the switch is switched from the second transmitter to the first transmitter during the second state.

5. The method of claim 4, wherein
    the first path is from the first transmitter through a splitter to the first service group,
    the third path is from the first transmitter through the splitter and the switch to the second service group, and
    the second path includes an attenuator that introduces a first power loss substantially equal to the power loss introduced by the splitter.

6. The method of claim 5, wherein:
    the switch comprises a first switch,
    during the first state, the first path is from the first transmitter through a second switch and a third switch to the first service group, and the second path is from the second transmitter through the first switch to the second service group, and
    during the second state, the first switch, the second switch, and the third switch are switched such that the third path is from the first transmitter through the second switch, the splitter, and the first switch to the second service group, and the first path is changed to a fourth path from the first transmitter through the second switch, the splitter, and the third switch to the first service group.

7. The method of claim 4, wherein
    the switch comprises a first switch,
    the first path is from the first transmitter through the switch and a first splitter to the first service group,
    the third path is from the first transmitter through the first switch, the first splitter, a first amplifier, a second switch, and a second splitter to the second service group, and
    the second path is from the second transmitter through the second switch and the second splitter to the second service group.

8. The method of claim 1, wherein the switch network includes a fourth path to perform sparing to add a spare network component when one of the plurality of network components fails.

9. The method of claim 8, wherein:
    during the second state, switching a set of first switches in the fourth path to provide the third path from the first transmitter to the second service group, and
    switching a second switch in the second path such that the first network component is coupled to the second service group in the third path.

10. The method of claim 9, wherein:
    during the second state, when one of the plurality of network components fails, switching the set of first switches such that the spare network component replaces the one of the plurality of network components that failed,
    placing the second network component into an active state at a higher power level than the lower power state;
    switching the second switch such that the second network component is coupled to the second service group, and
    the first network component services the first service group and the second network component services the second service group.

11. The method of claim 9, wherein:
during the first state,
the first path is from the first transmitter through a third switch and a first splitter to the first service group,
the second path is from the second transmitter through the second switch to the second service group, and
the third path is from the first transmitter through the third switch, the first splitter, at least a portion of the set of first switches, and the second switch to the second service group.

12. The method of claim 11, wherein:
the first path is further through a first amplifier,
the second path is further through a second amplifier and a second splitter, and
the third path is the first transmitter through the third switch, the first amplifier, the first splitter, the set of first switches, the second switch, a second amplifier, and the second splitter to the second service group.

13. The method of claim 11, wherein:
the second path is further through an attenuator, and
the third path is the first transmitter through the third switch, the first splitter, the set of first switches, and the second switch to the second service group.

14. The method of claim 1, wherein the switch network includes a fourth path for adjacent sparing in which adjacent network components and a spare network component are used for sparing when one of the plurality of network components fails.

15. The method of claim 14, wherein:
the first path is through a first splitter through a first switch to the first service group,
the second path is through a second splitter through a second switch to the second service group, and
the third path is through the first splitter, the second switch to the second service group, wherein the second switch is switched from the second network component to the first network component during the second state.

16. The method of claim 15, wherein:
during the second state, when one of the plurality of network components fails, performing:
using the third path for providing service to the second service group to allow for adjacent sparing; and
using a fourth path to allow the spare network component to provide service to the first service group.

17. The method of claim 1, wherein the switch network includes a fourth path for adjacent sparing in which an adjacent network component becomes a spare network component when one of the plurality of network components fails.

18. The method of claim 17, wherein:
during the first state:
the first path is through a first switch and a second switch to the first service group, and
the second path is through a third switch and a fourth switch to the second service group, and
during the second state:
the first path is through the first switch, a splitter, a fifth switch, and the second switch to the first service group, and
the third path is through the first switch, the splitter, a sixth switch, and the fourth switch to the second service group.

19. The method of claim 18, wherein:
during the second state, when one of the plurality of network components fails, using the third path for providing service to the second service group to allow for adjacent sparing.

20. An apparatus configured to manage power in a distribution network that includes a plurality of network components coupled to a plurality of service groups of subscribers, the apparatus comprising:
one or more computer processors; and
a non-transitory computer-readable storage medium comprising instructions that, when executed, control the one or more computer processors to be configured for:
selecting a period to switch between a first state to a second state, wherein the second state is where at least one service group is consolidated with another service group in the plurality of service groups and the first state is where the at least one service group is not consolidated with the another service group;
during the first state, controlling a switching network to provide a first path from a first network component in the plurality of network components to a first service group and a second path from a second network component in the plurality of network components to a second service group; and
when switching from the first state to the second state, performing:
changing the switching network to change the second path from the second network component to the second service group to a third path from the first network component to the second service group, wherein the first network component services the first service group and the second service group; and
placing the second network component into a lower power state after changing the switching network.

21. A system configured to manage power in a distribution network that includes a plurality of network components coupled to a plurality of service groups of subscribers, the apparatus comprising:
a controller for selecting a period to switch between a first state to a second state, wherein the second state is where at least one service group is consolidated with another service group in the plurality of service groups and the first state is where the at least one service group is not consolidated with the another service group; and
a switching network, wherein during the first state, the switching network provides a first path from a first network component in the plurality of network components to a first service group and a second path from a second network component in the plurality of network components to a second service group,
wherein the controller, when switching from the first state to the second state, performs:
changing the switching network to change the second path from the second network component to the second service group to a third path from the first network component to the second service group, wherein the first network component services the first service group and the second service group; and
placing the second network component into a lower power state after changing the switching network.

* * * * *